US008552984B2

(12) United States Patent
Knaven

(10) Patent No.: US 8,552,984 B2
(45) Date of Patent: Oct. 8, 2013

(54) METHOD, SYSTEM, APPARATUS AND COMPUTER-READABLE MEDIA FOR DIRECTING INPUT ASSOCIATED WITH KEYBOARD-TYPE DEVICE

(75) Inventor: Peter Knaven, North Vancouver (CA)

(73) Assignee: 602531 British Columbia Ltd., Vancouver, B.C. (CA)

( * ) Notice: Subject to any disclaimer, the term of this patent is extended or adjusted under 35 U.S.C. 154(b) by 1360 days.

(21) Appl. No.: 11/036,267

(22) Filed: Jan. 13, 2005

(65) Prior Publication Data
US 2006/0152496 A1 Jul. 13, 2006

(51) Int. Cl.
*G06F 3/02* (2006.01)
*G09G 5/00* (2006.01)

(52) U.S. Cl.
USPC .............................. 345/168; 345/2.1; 715/773

(58) Field of Classification Search
USPC .............................. 345/168–172, 2.1; 715/773
See application file for complete search history.

(56) References Cited

U.S. PATENT DOCUMENTS

| 3,644,898 | A | 2/1972 | Post | |
|---|---|---|---|---|
| 4,211,497 | A | 7/1980 | Montgomery | 400/486 |
| 4,330,845 | A | 5/1982 | Damerau | |
| 4,396,992 | A | 8/1983 | Hayashi et al. | 364/900 |
| 4,471,459 | A | 9/1984 | Dickinson et al. | |
| 4,499,553 | A | 2/1985 | Dickinson et al. | |
| 4,559,598 | A | 12/1985 | Goldwasser et al. | 364/419 |
| 4,648,044 | A | 3/1987 | Hardy et al. | |
| 4,689,768 | A | 8/1987 | Heard et al. | |
| 4,730,252 | A | 3/1988 | Bradshaw | 364/403 |
| 4,744,050 | A | 5/1988 | Hirosawa et al. | 364/900 |
| 4,774,666 | A | 9/1988 | Miyao et al. | 364/419 |
| RE32,773 | E | 10/1988 | Goldwasser et al. | 364/419 |
| 4,782,464 | A | 11/1988 | Gray et al. | |
| 4,783,761 | A | 11/1988 | Gray et al. | |

(Continued)

FOREIGN PATENT DOCUMENTS

| EP | 0 352 377 A1 | 1/1990 |
|---|---|---|
| EP | 0 643 357 A2 | 3/1995 |

(Continued)

OTHER PUBLICATIONS

Don Hopkins, "A Description of Pie Menus" (http://catalog.com/hopkins/piemenus/PieMenuDescription.html).

(Continued)

*Primary Examiner* — Michael Pervan
(74) *Attorney, Agent, or Firm* — Kilpatrick Townsend & Stockton LLP

(57) ABSTRACT

In one aspect of the present invention a computer-implemented method is provided of processing input key events associated with user input received from a keyboard-type device, wherein the keyboard-type device selected from at least one of a keyboard and a keypad. In this aspect, input key events associated with a first process active within an operating system are received and monitored for a first predefined input key event associated with user selection of a first key of the keyboard-type device for at least a predetermined time period. In response to identifying the first predefined input key event, the input key events are redirected from the first process to a second process. The input key events are monitored for a second predefined input key event associated with further redirection of the input key events. In response to identifying the second predefined input key event, the input key events are redirected to the first process.

53 Claims, 21 Drawing Sheets

(56) References Cited

U.S. PATENT DOCUMENTS

| | | | |
|---|---|---|---|
| 4,786,765 A | 11/1988 | Yamanami et al. | |
| 4,807,181 A | 2/1989 | Duncan, IV et al. | 364/900 |
| 4,847,766 A | 7/1989 | McRae et al. | |
| 4,891,786 A | 1/1990 | Goldwasser | 364/900 |
| 4,969,097 A | 11/1990 | Levin | 364/419 |
| 4,980,855 A | 12/1990 | Kojima | |
| 5,040,113 A | 8/1991 | Mickunas | 364/419 |
| 5,060,154 A | 10/1991 | Duncan, IV. | |
| 5,067,165 A | 11/1991 | Nishida | |
| 5,096,423 A | 3/1992 | Goldwasser | 434/118 |
| 5,203,704 A | 4/1993 | McCloud | 434/156 |
| 5,218,536 A | 6/1993 | McWherter | |
| 5,220,649 A | 6/1993 | Forcier | 715/541 |
| 5,220,652 A | 6/1993 | Rowley | 395/275 |
| 5,258,748 A | 11/1993 | Jones | |
| 5,261,112 A | 11/1993 | Futatsugi et al. | |
| 5,297,041 A | 3/1994 | Kushler et al. | 364/419.15 |
| 5,305,205 A | 4/1994 | Weber et al. | |
| 5,327,161 A | 7/1994 | Logan et al. | 345/157 |
| 5,329,609 A | 7/1994 | Sanada et al. | |
| 5,347,295 A | 9/1994 | Agulnick et al. | |
| 5,392,447 A | 2/1995 | Schlack et al. | |
| 5,487,616 A | 1/1996 | Ichbiah | 400/489 |
| 5,500,935 A | 3/1996 | Moran et al. | 395/156 |
| 5,543,818 A | 8/1996 | Scott | |
| 5,559,942 A | 9/1996 | Gough et al. | |
| 5,574,482 A | 11/1996 | Niemeier | 345/173 |
| 5,594,640 A | 1/1997 | Capps et al. | |
| 5,596,699 A | 1/1997 | Driskell | 395/352 |
| 5,606,674 A | 2/1997 | Root | |
| 5,621,641 A | 4/1997 | Freeman | 395/796 |
| 5,623,406 A | 4/1997 | Ichbiah | 395/753 |
| 5,629,733 A | 5/1997 | Youman et al. | |
| 5,649,223 A | 7/1997 | Freeman | 395/796 |
| 5,657,397 A | 8/1997 | Bokser | |
| 5,666,139 A | 9/1997 | Thielens et al. | |
| 5,689,667 A | 11/1997 | Kurtenbach | 395/352 |
| 5,704,029 A | 12/1997 | Wright, Jr. | 715/505 |
| 5,724,457 A | 3/1998 | Fukushima | |
| 5,734,749 A | 3/1998 | Yamada et al. | |
| 5,745,116 A | 4/1998 | Pisutha-Arnond | 345/358 |
| 5,758,324 A | 5/1998 | Hartman et al. | |
| 5,790,115 A | 8/1998 | Pleyer et al. | |
| 5,805,158 A | 9/1998 | Bertram et al. | |
| 5,805,159 A | 9/1998 | Bertram et al. | |
| 5,805,167 A | 9/1998 | Van Cruyningen | 345/353 |
| 5,805,911 A | 9/1998 | Miller | 395/796 |
| 5,812,697 A | 9/1998 | Sakai et al. | |
| 5,818,437 A * | 10/1998 | Grover et al. | 715/811 |
| 5,821,512 A | 10/1998 | O'Hagan et al. | |
| 5,835,635 A | 11/1998 | Nozaki et al. | |
| 5,838,302 A | 11/1998 | Kuriyama et al. | |
| 5,845,300 A | 12/1998 | Comer et al. | |
| 5,864,340 A | 1/1999 | Bertram et al. | |
| 5,881,169 A | 3/1999 | Henry, Jr. | |
| 5,896,321 A | 4/1999 | Miller et al. | 365/189.01 |
| 5,911,485 A | 6/1999 | Rossmann | |
| 5,914,708 A | 6/1999 | LaGrange et al. | 345/179 |
| 5,926,178 A | 7/1999 | Kurtenbach | 345/352 |
| 5,943,039 A | 8/1999 | Anderson et al. | |
| 5,949,408 A | 9/1999 | Kang et al. | 345/146 |
| 5,953,541 A | 9/1999 | King et al. | |
| 5,959,629 A | 9/1999 | Masui | 345/347 |
| 5,963,666 A | 10/1999 | Fujisaki et al. | 382/187 |
| 5,963,671 A | 10/1999 | Comerford et al. | 382/230 |
| 5,974,558 A | 10/1999 | Cortopassi et al. | |
| 5,977,887 A | 11/1999 | Grimmett | |
| 5,977,948 A | 11/1999 | Nishibori | |
| 5,982,351 A | 11/1999 | White et al. | |
| 6,002,390 A | 12/1999 | Masui | 345/173 |
| 6,005,549 A | 12/1999 | Forest | 345/157 |
| 6,008,799 A | 12/1999 | Van Kleeck | 345/173 |
| 6,011,554 A | 1/2000 | King et al. | |
| 6,026,233 A | 2/2000 | Shulman et al. | |
| 6,037,942 A | 3/2000 | Millington | |
| 6,084,576 A | 7/2000 | Leu et al. | 345/168 |
| 6,088,649 A | 7/2000 | Kabada et al. | |
| 6,094,197 A | 7/2000 | Buxton et al. | 345/863 |
| 6,097,392 A | 8/2000 | Leyerle | |
| 6,097,841 A | 8/2000 | Gunji et al. | |
| 6,098,086 A | 8/2000 | Krueger et al. | |
| 6,101,461 A | 8/2000 | Ukigawa et al. | |
| 6,111,985 A | 8/2000 | Hullender et al. | |
| 6,144,378 A | 11/2000 | Lee | |
| 6,148,104 A | 11/2000 | Wang | |
| 6,154,758 A | 11/2000 | Chiang | |
| 6,167,411 A | 12/2000 | Narayanaswamy | |
| 6,167,412 A | 12/2000 | Simons | |
| 6,188,789 B1 | 2/2001 | Marianetti, II et al. | 382/189 |
| 6,256,030 B1 | 7/2001 | Berry et al. | |
| 6,262,719 B1 | 7/2001 | Bi et al. | 345/179 |
| 6,275,612 B1 | 8/2001 | Imoto | |
| 6,282,315 B1 | 8/2001 | Boyer | |
| 6,286,064 B1 | 9/2001 | King et al. | |
| 6,292,179 B1 | 9/2001 | Lee | 345/173 |
| 6,295,372 B1 | 9/2001 | Hawkins et al. | 382/187 |
| 6,307,549 B1 | 10/2001 | King et al. | 345/352 |
| 6,369,807 B1 | 4/2002 | Nakashima | 345/179 |
| 6,377,965 B1 | 4/2002 | Hachamovitch et al. | 715/534 |
| 6,405,060 B1 | 6/2002 | Schroeder et al. | |
| 6,424,983 B1 | 7/2002 | Schabes et al. | |
| 6,442,295 B2 | 8/2002 | Navoni et al. | |
| 6,473,006 B1 | 10/2002 | Yu et al. | |
| 6,487,424 B1 | 11/2002 | Kraft et al. | |
| 6,502,114 B1 | 12/2002 | Forcier | |
| 6,539,421 B1 | 3/2003 | Appelman et al. | |
| 6,608,639 B2 | 8/2003 | McGovern | |
| 6,621,939 B1 | 9/2003 | Negishi | |
| 6,646,572 B1 | 11/2003 | Brand | |
| 6,654,733 B1 | 11/2003 | Goodman et al. | 706/52 |
| 6,661,920 B1 | 12/2003 | Skinner | 382/187 |
| 6,734,881 B1 | 5/2004 | Will | |
| 6,751,603 B1 | 6/2004 | Bauer et al. | |
| 6,801,190 B1 | 10/2004 | Robinson et al. | |
| 6,888,141 B2 | 5/2005 | Carr | |
| 6,934,906 B1 | 8/2005 | Cheok | |
| 6,970,513 B1 | 11/2005 | Puri et al. | |
| 6,978,421 B1 | 12/2005 | Aida | |
| 7,003,446 B2 | 2/2006 | Trower et al. | |
| 7,224,409 B2 | 5/2007 | Chin et al. | |
| 7,322,023 B2 | 1/2008 | Shulman | |
| 2001/0000962 A1 | 5/2001 | Rajan | |
| 2001/0027468 A1 | 10/2001 | Okura | |
| 2002/0067377 A1 | 6/2002 | McGovern | 345/816 |
| 2002/0087279 A1 | 7/2002 | Hall | |
| 2003/0137605 A1 | 7/2003 | Chin et al. | |
| 2004/0021691 A1* | 2/2004 | Dostie et al. | 345/773 |
| 2005/0198144 A1 | 9/2005 | Kraenzel et al. | |
| 2005/0210402 A1 | 9/2005 | Gunn et al. | |
| 2005/0223308 A1 | 10/2005 | Gunn et al. | |
| 2006/0265208 A1 | 11/2006 | Assadollahi | |
| 2007/0188472 A1* | 8/2007 | Ghassabian | 345/169 |

FOREIGN PATENT DOCUMENTS

| | | |
|---|---|---|
| EP | 0 643 357 A3 | 3/1996 |
| EP | 0 844 570 A2 | 5/1998 |
| EP | 0 844 571 A2 | 5/1998 |
| EP | 0 472 444 B1 | 8/1998 |
| EP | 0 858 023 A2 | 8/1998 |
| EP | 0 858 023 A3 | 9/1998 |
| EP | 0 844 570 A3 | 8/1999 |
| EP | 0 844 571 A3 | 8/1999 |
| EP | 0 982 676 A1 | 3/2000 |
| JP | 10105324 A | 4/1998 |
| JP | 10154033 A | 6/1998 |
| JP | 10154144 A | 6/1998 |
| JP | 11143614 | 5/1999 |
| JP | 11167569 A | 6/1999 |
| JP | 10333818 | 4/2002 |
| WO | WO 96/09579 | 3/1996 |
| WO | WO 98/11480 | 3/1998 |
| WO | WO 99/28811 | 6/1999 |

(56) References Cited

FOREIGN PATENT DOCUMENTS

| WO | WO 01/95095 A2 | 12/2001 |
|---|---|---|
| WO | WO 0233527 A2 * | 4/2002 |
| WO | WO 2004/107101 A2 | 12/2004 |

OTHER PUBLICATIONS

Don Hopkins, "Natural Selection: The Evolution of Pie Menus", BayCHI, Oct. 13, 1998 (http://catalog.com/hopkins/piernenus/Natural Selection.html).
Russell Nelson, "Pie Menu Window Manager", Jun. 3, 1998 (http://www.crynwr.com/piewm/).
Don Hopkins, "ActiveX Pie Menus" (http://catalog.com/hopkins/piemenus/ActiveXPieMenus.html).
Don Hopkins, "Pie Menu References" (http://catalog.com/hopkins/piemenu-references.html).
Don Hopkins, "Pie Menus" (http://art.net/~hopkins/Don/piemenus/index.html).
Office Action dated Jan. 14, 2005, issued for U.S. Appl. No. 09/631,101.
Office Action dated Jan. 20, 2004, issued for U.S. Appl. No. 09/631,101.
Office Action dated Jun. 14, 2005, issued for U.S. Appl. No. 09/631,101.
Office Action dated Mar. 20, 2006, issued for U.S. Appl. No. 09/631,101.
Office Action dated Oct. 18, 2006, issued for U.S. Appl. No. 10/399,560.
Office Action dated Jan. 5, 2007, issued for U.S. Appl. No. 09/631,101.
Office Action dated May 18, 2007, issued for U.S. Appl. No. 11/134,759.
Office Action dated Jun. 4, 2007, issued for U.S. Appl. No. 09/631,101.
Office Action dated Jun. 7, 2007, issued for U.S. Appl. No. 11/133,770.
Office Action dated Jul. 17, 2007, issued for U.S. Appl. No. 10/399,560.
Office Action dated Mar. 4, 2008, issued for U.S. Appl. No. 11/133,770.
Office Action dated Apr. 15, 2008, issued for U.S. Appl. No. 10/399,560.
Office Action dated Apr. 3, 2008, issued for U.S. Appl. No. 11/134,759.
Office Action dated Nov. 24, 2008, issued for U.S. Appl. No. 11/133,770.
Office Action dated Jan. 7, 2009, issued for U.S. Appl. No. 10/399,560.
Office Action dated Jan. 26, 2009, for U.S. Appl. No. 11/134,810.
Office Action dated Feb. 4, 2009, issued for U.S. Appl. No. 11/134,759.
Office Action dated Jun. 10, 2009, for U.S. Appl. No. 11/133,770.
Office Action dated Apr. 30, 2008, issued for U.S. Appl. No. 11/036,267.
Office Action dated Jan. 26, 2009, issued for U.S. Appl. No. 11/036,267.
Advisory Action dated Sep. 16, 2005, issued for U.S. Appl. No. 09/631,101.
Notice of Allowability dated Aug. 8, 2007, issued for U.S. Appl. No. 09/631,101.
IPER dated Jun. 19, 2001, issued for International Application No. PCT/CA00/00285.
IPER dated Dec. 9, 2003, issued for International Application No. PCT/CA01/01473.
Office Action dated Feb. 7, 2002, issued for E.P. Patent Application No. 00 910 460.5.
Office Action dated Jun. 23, 2005, issued for E.P. Patent Application No. 01 981 991.1.
Office Action dated Aug. 11, 2004, issued for E.P. Patent Application No. 01 981 991.1.
Partial European Search Report dated Mar. 4, 2009, for European Patent Application No. 07022182.5.
Extended European Search Report dated May 27, 2009 for European Patent Application No. 07022182.5.
3Com, "PalmPilot Handbook", 1997 3Com Corp., pp. 37-39.
Baeza-Yates, "*A New Approach to Text Searching*" (Preliminary Version), Centre for the New O.E.D. & Data Structuring Group, Department of Computer Science, University of Waterloo, pp. 168-175.
Bellman, T., & MacKenzie, I.S. (1998), A probabilistic character layout strategy for mobile text entry. Proceedings of Graphics interface '98, pp. 168-176, Toronto: Canadian Information Processing Society.
Bohan et al, "*A Psychophysical Comparison of Two Stylus-Driven Soft Keyboards*", Department of Psychology, Wichita State University.
Bohlman, Eric, "KeyCache—The Universal Input Accelerator, Version 2.1," copyright Sep. 29, 1994, OMS Development, documentation, downloaded from <http://www.sac.sk/files.php?d=16&1=K>, 12 pages.
Callhan at al abstract: . . . compare pie menus to linear menus.
Darragh et al., "*The Reactive Keyboard: A Predictive Typing Aid*" University of Calgary, Nov. 1990 .41-49.
Jones, P.E. "Virtual Keyboard with Scanning and Augmented by Prediction", 1998, Proc. $2^{nd}$ Euro. Conf. Disability, Virtual Reality & Assoc. Tec., Skovde, Sweden, 1998, pp. 45-51.
MacKenzie et al., "Alphanumeric Entry on Pen-Based Computers", 1994, Intl. Journal of Human-Computer Studies, 41, pp. 775-792, <http://www.yorku.ca/mack/IJHCS.html>.
MacKenzie et al., "*Text Entry Using Soft Keyboard*", 1999, Behavior & Information Tech., 18, pp. 235-244.
MacKenzie et al., "The Design and Evaluation of a High-Performance Soft Keyboard", 1999, ACM, pp. 25-31.
Mankopff et al, "Cirrin: A Word-level Unistroke Keyboard for Pen Input", 1998, ACM, pp. 213-214.
Masui, T. 1998, "An Efficient Text Input Method for Pen-based Computers," Apr. 18-23, 1998, In Proc. SIGCHI Conf. on Human Factors in Computing Systems (LC. Karat, A. Lund, J. Coutaz, and J. Karat, Eds. Conference on Human Factors in Computing Systems. ACM, pp. 328-335.
Masui, T. 1999, "POBox: An Efficient Text Input Method for Handheld and Ubiquitous Computers", In Proc. of $1^{st}$ Intl. Symp. on Computer Science, vol. 1707. Springer-Verlg, London, 289-300.
National Council on Disability Document Archive, software guide to alternative input and output programs, circa 1996, downloaded from <http://www.dimenet.com/disnews/archive.php?mode=P&id=49>, 12 pages.
NCIP, listing of Word Prediction & Writing Tools, circa 1997, downloaded from <http://www2.edc.org/ncip/LIBRARY/wp/Pubs.htm>, 7 pages.
SofType 3.1 Help File, circa 1997, downloaded from <http://orin.com/binaries/st31dmz.exe>, 38 pages.
SofType Version 3.1 Screendumps generated from demo version of software, downloaded from <http://orin.com/binaries/st31dmz.exe>, 21 Figures.
Venolia "*T-Cube: A Fast, Self-Disclosing Pen-Based Alphabet*", Boston, Massachusetts USA Apr. 24-28, 1994 Human Factors in Computing Systems, pp. 265-270.
Vitoria et al., "A Comparison of Prediction Techniques to Enhance the Communication Rate", Springer-Verlg, 2004, pp. 400-417.
Wivik 2 REP Software manual, circa Feb. 1998, Orentke Romich Company, downloaded from <http://web.archive.or web/20001204165600/wivik.com/html/downloads.htm>, 128 pages.
Wu and Manber, "*AGREP—A Fast Approximate Pattern-Matching Tool*", (Preliminary Version), Department of Computer Science, University of Arizona.
Darragh et al., "The Reactive keyboard, Cambridge Series on Human-Computer Interaction," Cambridge Univ. Press, © 1992, 186 pages.
Notice of Allowance dated Nov. 26, 2010 for U.S. Appl. No. 11/871,900.
Office Action dated Dec. 21, 2010 for U.S. Appl. No. 11/871,904.
Office Action dated Aug. 18, 2011 for U.S. Appl. No. 11/871,900.
Office Action dated Oct. 17, 2011 for U.S. Appl. No. 11/871,904.

(56) References Cited

OTHER PUBLICATIONS

Notice of Allowance dated Nov. 30, 2010 for U.S. Appl. No. 11/871,887.
Office Action dated Jul. 18, 2012 for U.S. Appl. No. 11/871,900.
Office Action dated Aug. 6, 2012 for U.S. Appl. No. 11/871,904.
Office Action dated Sep. 29, 2009 issued for U.S. Appl. No. 10/399,560.
Notice of Allowance issued or U.S. Appl. No. 11/134,810 on Nov. 30, 2009.
Office Action dated Feb. 25, 2010 for U.S. Appl. No. 11/134,759.
Julie, T9 Keyboard Review, the gadgeteer available at www.the-gadgeteer.com/1998/08/27/t9_keyboard_review/,Aug. 27, 1998 (accessed Feb. 23, 2010).
Office Action dated Apr. 14, 2010 for U.S. Appl. No. 11/871,887.
Office Action dated Mar. 31, 2010 for U.S. Appl. No. 11/871,900.
Office Action dated Apr. 14, 2010 for U.S. Appl. No. 11/871,904.
Jakobsson, Matti, "Autocompletion in Full Text Transaction entry: A Method for Humanized Input", Univ. of Vaasa, ACM, © 1986 pp. 327-332.
Notice of Allowance dated Dec. 28, 2009 for U.S. Appl. No. 11/133,770.
Notice of Allowance dated Nov. 26, 2010 issued for U.S. Appl. No. 11/871,900.
Notice of Allowance dated Nov. 30, 2010 issued for U.S. Appl. No. 11/871,887.
Toshiyuki Masui, Sony Computer Science Laboratory Inc., Shinagawa, Tokyo, "An Efficient Text Input Method for Pen-based Computers", Proceedings of the ACM Conference on Human Factors in Computing Systems, Apr. 1998, pp. 328-335.
Toshiyuki Masui, Sony Computer Science Laboratories, Inc., Shinagawa, Tokyo, "Integrating Pen Operations for Composition by Example".
Don Hopkins, "The Design and Implementation of Pie Menus", Dr. Dobb's Journal, Dec. 1991 (http://art.net/~hopkins/Don/piemenus/ddj/piemenus.hml).
Jason I. Hong, "Java Pie Menus", Sep. 4, 1999 (jttp://www.cs.berkeley.edu/~jasonh/download/sotware/piemenu/).
Tom Nantais, et al., IEEE Transactions on Rehabilitation Engineering, "A Predictive Selection Technique for Single-Digit Typing With a Visual Keybaord", No. 3 Sep. 1994.
"GtkPieMenu" 1999 orfelyus (2 pages).
Pre-Brief Appeal Conference Decision dated Jan. 14, 2013 for U.S. Appl. No. 11/871,900.
Advisory Action dated Dec. 6, 2012 for U.S. Appl. No. 11/871,900.
Pre-Brief Appeal Conference Decision dated Apr. 19, 2012 for U.S. Appl. No. 11/871,904.
Office Action dated Dec. 20, 2012 for U.S. Appl. No. 12/749,318.
Office Action dated Jan. 18, 2013 for U.S. Appl. No. 12/531,296.
Mercedes-Benz Navigation System—Operation Guide © 1997 Mercedes-Benz of North America Inc. Technical Information Order No. S-2690-097 Printed in the United States.
Mercedes-Benz AG Auto Pilot System—Guide (Translation attached).
Mercedes-Benz COMAND Betriebsanleitung—Navigation Guide (Translation attached).

* cited by examiner

ND, SYSTEM, APPARATUS AND
COMPUTER-READABLE MEDIA FOR
DIRECTING INPUT ASSOCIATED WITH
KEYBOARD-TYPE DEVICE

FIELD OF THE INVENTION

The present invention relates to a method, system, apparatus and computer-readable media for directing input associated with a keyboard-type device.

SUMMARY OF THE INVENTION

In one aspect of the present invention, there is provided a computer-implemented method of processing input key events associated with user input received from a keyboard-type device, the keyboard-type device selected from at least one of a keyboard and a keypad. In this aspect, the method comprises:
  (a) receiving input key events associated with a first process active within an operating system;
  (b) monitoring the input key events for a first predefined input key event associated with user selection of a first key of the keyboard-type device for at least a predetermined time period;
  (c) in response to identifying the first predefined input key event, redirecting the input key events from the first process to a second process;
  (d) monitoring the input key events for a second predefined input key event associated with further redirection of the input key events; and
  (e) in response to identifying the second predefined input key event, redirecting the input key events to another process.

Many variations of this method are contemplated, as described further in this specification. There is also provided a computer-readable medium having stored instructions for use in execution of the aforementioned method and its variations.

In another aspect of the present invention, there is provided a system for processing input key events associated with user input received from a keyboard-type device, the keyboard-type device selected from at least one of a keyboard and a keypad. In one arrangement, the system comprises:
  (a) means for receiving input key events associated with a first process active within an operating system;
  (b) means for monitoring the input key events for a first predefined input key event associated with user selection of a first key of the keyboard-type device for at least a predetermined time period;
  (c) means for redirecting the input key events from the first process to a second process in response to identifying the first predefined input key event;
  (d) means for monitoring the input key events for a second predefined input key event associated with further redirection of the input key events; and
  (e) means for redirecting the input key events to another process in response to identifying the second predefined input key event.

In yet another aspect of the present invention, there is provided a keyboard-type device comprising:
  (a) a plurality of user input signal generators for producing first input signals in response to user actuation thereof;
  (b) a display device;
  (c) a processor circuit in communication with said display device and said user input signal generators, said processor circuit configured to:
    (i) generate a plurality of predictive text completion candidates in response to said first input signals and display said plurality of predictive text completion candidates on said display device; and
    (ii) communicate at least one of said predictive text completion candidates to a personal computing device remote from the keyboard-type device in response to user selection of the at least one of said predictive text completion candidates.

Several other aspects and features of the present invention will become apparent to those ordinarily skilled in the art upon review of the following description of specific embodiments of the invention in conjunction with the accompanying drawings.

BRIEF DESCRIPTION OF THE DRAWINGS

In the accompanying drawings which illustrate embodiments of the invention.

DETAILED DESCRIPTION

Reference will now be made in detail to implementations and embodiments of the invention, examples of which are illustrated in the accompanying drawings.

Introduction

Figure 1:
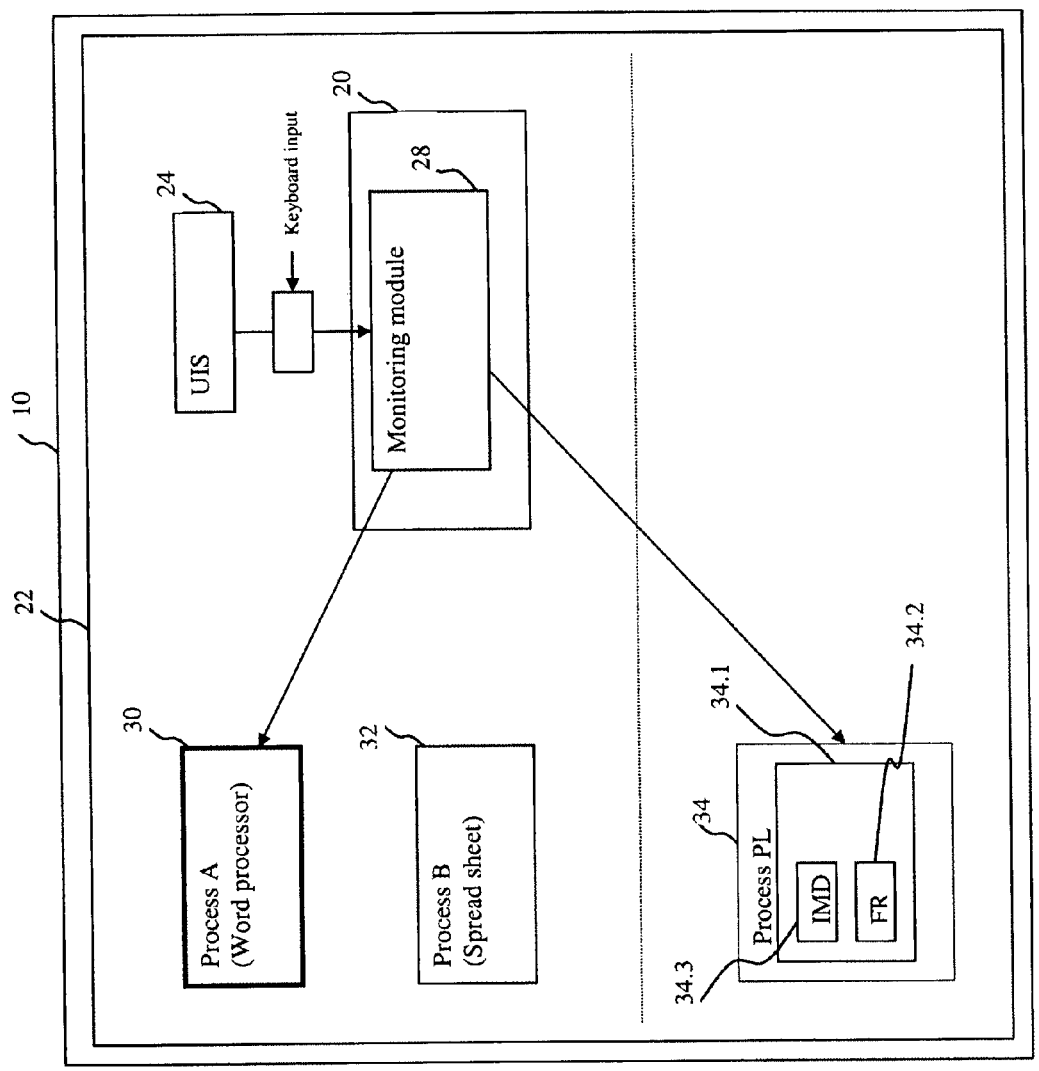
FIG. 1 is a block diagram of an input management system in use in association with a first process and a second process, according to a first embodiment of the invention.
Figure 2:
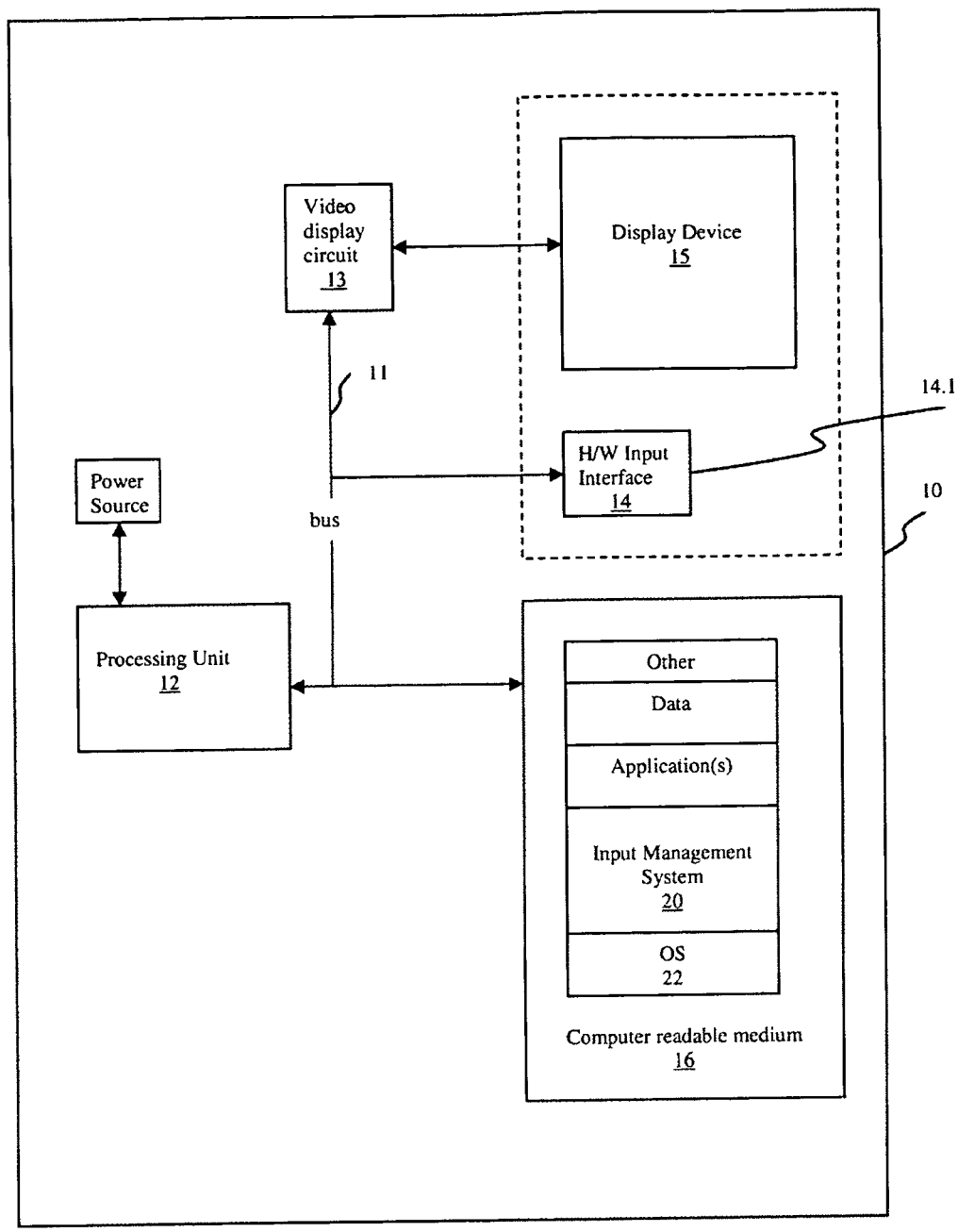
FIG. 2 is a block diagram of a personal computing device loaded with a data entry system, according to a first embodiment of the invention.

Referring to FIGS. 1 and 2, in accordance with a first embodiment a computer-implemented input management system 20 is configured to process input key events associated with user input received by a personal computing device 10 from a keyboard-type device 14. In the first embodiment, for illustration purposes, the personal computing device 10 is a laptop and the keyboard-type device 14 is a keyboard 14.1 (for example, a QWERTY-type keyboard). As discussed further below, however, many various types of personal computing devices and keyboard-type devices (including keyboards and keypads) can be used in connection with the present invention and the components described in the first embodiment are meant to be illustrative only.

The input management system 20 operates in association with a computer-implemented operating system 22, which for the purposes of the first embodiment is Windows XP™. Both the input management system 20 and the operating system 22 are stored on and run on the personal computing device 10 in the first embodiment. In other embodiments, the personal computing device may be operative over a computer network with some or all of the operating system 22 located on a host computer server or other remote computing device. Similarly, the input management system 20 may be located on a remote computer server or other remote computing device and accessed remotely by a terminal-type unit or by another form of personal computing device (including personal computing device 10).

The input management system 20 is configured to monitor a user input stream 24 associated with a first process 30 active within the operating system 22. The user input stream 24 comprises codes representing input key events associated with user operation of the keyboard-type device 14. As the user operates the keyboard-type device 14, selecting and deselecting keys, the codes are received by the personal computing device 10 and identified as input key events by the operating system 22.

The input management system 20 monitors the user input stream 24 for an occurrence of a first predefined input key event associated with user selection of a first key of the keyboard-type device 14 for at least a predetermined time period $T_1$. In the first embodiment, the input management system 20 comprises a monitoring module 28 configured to perform the monitoring of the user input stream 24. In response to identifying the occurrence of the first predefined input key event, the input management system 20 is configured to redirect the user input stream 24 from the first process 30 to a second process 34.

For the purposes of this specification, the term "process" means a computer-implemented process for completing a set of computer-implemented instructions in order to provide predetermined functionality to a user and which is receptive to user input. Such a process can be a computer program, including a software application, applet or the like, and can be either an independent program or it may be a program that provides certain functionality to a larger program.

Windows Applications

In the first embodiment, processes are represented by windows applications which are displayed on a graphical user interface. For illustration purposes, the first process 30 is a word processor application, more particularly Microsoft™ Word™, and the second process 34 is a predictive text entry system 34.1. In the illustrated embodiment, the predictive text entry system 34.1 is an application configured to predict and retrieve predictive text completion candidates (or completion candidates) from a dictionary by determining which predictive text completion candidates in the dictionary are more likely to be the ones that the user is attempting to type based on the characters in the partial text entry generated by the user, as illustrated in co-owned U.S. patent application Ser. No. 10/399,560 (corresponding to PCT/CA01/01473, International Publication No. WO 02/33527 A2). Various forms of the predictive text entry system 34.1 may be used as illustrated in PCT/CA01/01473. Preferably, potential completion candidates retrieved by the predictive text entry system 34.1 are displayed in a searchable list and may be selected using the keyboard or a mouse or a combination of both the keyboard and the mouse. Other types of predictive text entry systems may be used in the present case. By way of example, other predictive text entry systems are illustrated in co-owned U.S. patent application Ser. No. 09/272,700 (PCT/CA00/000285, International Publication No. WO 00/57265).

As indicated above, the use of the word processor application as the first process 30 and the predictive text entry system 34.1 as the second process 34 are for illustration purposes. It will be appreciated that many other end-user processes may be used in substitution of a word processor and the predictive text entry system 34.1. By way of example, the first process 30 can, in the alternative, be a spreadsheet, a browser, a database interface, an enterprise resource planning system, or some other form of process providing functionality to a user and receptive to user input in association with a keyboard-type device. In addition or in the alternative, the second process 34 can be another form of predictive text entry system or some other process configured to provide additional functionality to the user in association with the first process 30 or to another process operative in connection with the second process 34 in response to redirection of the user input stream 24.

Redirecting the user input stream 24 to the second process 34 in response to the first predefined input key event for at least the predetermined time period $T_1$ enables the input management system 20 to provide an adaptive interface for enhancing the functionality of the first process 30 with functionality provided by the second process 34. Alternatively, the redirection mechanism provided by the input management system 20 can be used to invoke one or more other processes to enhance the functionality of the first process 30 or another process available on or through the personal computing device 10. The redirection mechanism of the input management system 20 is described in further detail below.

In the first embodiment, once the user input stream 24 has been redirected to the second process 34, the input management system 20 monitors the user input stream 24 for an occurrence of a second predefined input key event associated with further redirecting the user input stream 24. In response to identifying the occurrence of the second predefined input key event, the input management system 20 redirects the user input stream 24 to either the first process 30 or another process. In the case of the first embodiment, the input management system 20 redirects the user input stream 24 back to the first process 30.

Input Key Events and Keyboard-Type Input

Input key events associated with user operation of the keyboard-type device 14 are communicated to the applicable process via the operating system 22. An input key event represents an event associated with a particular key or set of keys supported by the keyboard-type device 14. In general, an input key event is associated with user selection or deselection of a key or set of keys available the keyboard-type device 14. For example, selection of a particular key on the keyboard-type device 14 represents one input key event, and deselection of the selected key represents another input key event. Selection of a particular key for at least predefined period of time $T_1$ represents another input key event associated with user operation of the keyboard-type device 14. Input key events are used by the input management system 20 to manage the direction of the user input stream 24 and to determine which process or set of processes will receive the user input stream 24 in response to or during a particular input key event or set of input key events.

As mentioned earlier, in the first embodiment the keyboard-type device 14 is preferably a keyboard 14.1. In this case, keyboard input is received from the keyboard 14.1 by the personal computing device 10 in the form of input key events (in this embodiment, also referred to as keyboard events) which are processed by the operating system 22. Preferably, keyboard input is received by the operating system 22 via a keyboard device driver that receives scan codes from the keyboard 14.1. The scan codes represent identifiers associated with the respective keys on the keyboard 14.1. Each key on the keyboard 14.1 preferably has a unique scan code value associated with it. The mechanism by which scan codes are implemented can be device dependent and therefore the keyboard device driver applicable to the keyboard 14.1 device in use provides a mechanism for receiving scan codes from the applicable keyboard 14.1 and for having the scan codes translated into virtual key codes recognizable by the operating system 22. Keyboard device drivers and their use in connection with keyboard devices are well known in the art.

In the first embodiment, where the operating system 22 is Windows XP™, the keyboard device driver interprets a scan code and translates it into a virtual key code which is a device independent value defined by the operating system 22 that identifies the purpose of a key. The keyboard 14.1 generates two scan codes when a user selects a key on the keyboard 14.1. One scan code is generated when the user selects the key and another is generated when the user deselects the key.

System Level Focus for Keyboard Input

Keyboard input received from the keyboard 14.1 is communicated via the operating system 22 to the process that has the keyboard focus. The keyboard focus is used as a mechanism for determining which process is currently assigned to receive keyboard input. The keyboard focus can be set to a particular process using the commands available with the applicable operating system 22. For example, with Windows XP™ the keyboard focus can be given to one of the applications (or windows) preferably by calling the SetFocus function and the AttachThreadInput function available with the Windows XP™ operating system. With Windows XP™ a window can be made active and brought to the foreground in the graphical user interface by setting the window using the SetActiveWindow and SetForegroundWindow functions provided by Windows XP™. In the first embodiment, keyboard input received from the keyboard 14.1 is translated by the operating system 22 and posted as a keyboard message to a message queue of the thread that created the window with the keyboard focus. Eventually, the keyboard message is removed from the message queue and passed to the appropriate window procedure of the window with the keyboard focus. This form of keyboard focus is well known in the art and is referred to in this specification as operating system-level keyboard focus. More generally, the term "system-level input focus" is used in this specification to refer to the assignment of input received from a keyboard-type device to a process through functionality provided by the operating system (such as through a programmable interface or API available with the operating system). System-level input focus includes the operating system-level keyboard focus described above.

In the first embodiment, the operating system 22 shares the keyboard 14.1 among the various processes running within the operating system 22 (where these processes are represented in the first embodiment as windows applications running within Windows XP™), by shifting the keyboard focus from one window (process) to another window (process) at the user's direction. The window that has the keyboard focus receives the keyboard messages from the user input stream 24 until the keyboard focus changes to a different window. The keyboard focus can be shifted from one window (process) to another window (process) through a variety of activities including, but not limited to, the user opening a new application using the keyboard 14.1, a mouse or another human input device; by the user shifting keyboard focus from one window to another window that does not currently have keyboard focus (for example by switching windows by using the mouse to click on a window that does not currently have keyboard focus), or by some other action of the user that the operating system 22 is configured to recognize as a shift in keyboard focus from one window (process) to another window (process) running on the operating system 22. Other examples of a user switching windows would be by a user selecting a window that does not have system focus by using the ALT and TAB key or ALT and ESC key, or by selecting it from the task bar in Windows XP™.

In the absence of the input management system 20, keyboard input, once translated by the applicable keyboard device driver, would be placed in an applicable message queue for receipt by the application in the window that currently has the keyboard focus. As illustrated in FIG. 1, the input management system 20 interposes itself between the translated keyboard input and the process(es) which may receive the translated keyboard input. By interposing itself in this way, the input management system 20 can be used to redirect keyboard input received in the user input stream 24 to one or more other processes that provide enhanced functionality (expander processes) in association with the process that previously had keyboard focus before redirection occurred.

Logical Focus

As discussed above, keyboard input can be directed to a particular process using the system-level input focus provided by the operating system 22. This is one approach to control the flow of the user input stream 24 for some embodiments, if the operating system 22 and the associated personal computing device operate fast enough to handle a rapid stream of input from the keyboard-type device. However, managing redirection of the user input stream 24 solely through the assignment of system-level input focus can present certain challenges. For example, from the perspective of the input management system 20, with certain Windows™ applications such as the Internet Explorer™ browser or the Excel™ spreadsheet, one cannot reliably maintain the same state of the original application when switching input focus at the operating system level back to the original application following a redirection. As well, with certain operating systems such as Windows™, certain applications, such as the MS-DOS™ command window, will not automatically give up system-level input focus.

In the first embodiment, a timer mechanism is preferably implemented to provide another layer of keyboard focus. In this way, with the introduction of the input management system 20, at least two levels of keyboard focus are supported: the keyboard focus provided at the operating system level (earlier referred to more generally as the system-level input focus), and a logical keyboard focus supported by the input management system 20. For the purposes of this specification, "logical keyboard focus" refers to an assignment of keyboard input to a process while another process continues to be assigned operating system-level keyboard focus. More generally, in this specification the term "logical input focus"

refers to an assignment of input from a keyboard-type device to a process while another process continues to be assigned system-level input focus. Thus, in the first embodiment, through the use of logical keyboard focus, the input management system 20 is configured to support the redirection of keyboard input from one process to another process even though the first process continues to be assigned keyboard focus at the operating system level. In this way, keyboard input from the keyboard 14.1 can be directed towards the appropriate process based on the context in which the keyboard input is being received even though another process has been assigned keyboard focus at the operating system level and would be therefore entitled to otherwise receive the keyboard input. Enabling the redirection of keyboard input to be independent of which process has keyboard focus at the operating system level provides a significant advantage in that it allows the input management system 20 to support redirection of the keyboard input to one or more processes independent of limitations imposed by the operating system 22 on keyboard focus at the operating system level. Moreover, this approach provides improved consistency in how input from the keyboard 14.1 (more generally, from a keyboard-type device) is received by applications in the presence of one or more processes that provide expanded functionality for one or more of the other processes resident in the operating system 22.

Operating Environment

The personal computing device 10 in the first embodiment is a laptop computer having a graphical display device comprising a liquid crystal display.

FIG. 2 shows, for illustration purposes, a block diagram of personal computing device 10 according to the first embodiment. As shown in FIG. 2, the personal computing device 10 comprises a processing unit 12 (for example, a CPU) connected via bus 11 to a computer-readable medium 16. The computer-readable medium 16 provides a memory store for computer programs and data residing in the personal computing device 10, including, in the first embodiment, the input management system 20, the operating system 22, the first process 30, represented by the word processor Microsoft™ Word™, and the second process 34, represented by the predictive text entry system 34.1. The computer-readable medium 16 can include one or more types of computer-readable media including volatile memory such as Random Access Memory (RAM), and non-volatile memory, such as a hard disk or Read Only Memory (ROM). In the first embodiment, the computer-readable medium available on the personal computing device 10 comprises RAM, ROM and a hard disk drive. Other types of user programs can also be stored in the personal computing device 10 and used in connection with the input management system 20 such as a browser or micro-browser, a spreadsheet, an email application or another user application.

The keyboard-type device 14 provides a mechanism for providing user input to programs running on the personal computing device 10. As discussed earlier, user input is received from the keyboard-type device 14 in the form of codes received in user input stream 24 and which represent input key events associated with user operation of the keyboard-type device 12. As indicated above, in the first embodiment the keyboard-type device 14 is a QWERTY-type keyboard. However, the keyboard-type device 14 can be a keyboard, a keypad or both a keyboard and a keypad, and the actual configuration of a keyboard or keypad can vary (such as, by way of example, keyboard configurations from Logitech™, keyboard configurations from Dell Corporation, the Half Keyboard™ by Matias Corporation, and the Dvorak keyboard layout). In addition, various types of keyboards and keypads may be used in connection with the input management system, including, but not limited to, physical keyboards and keypads, and virtual keyboards and virtual keypads (also referred to as soft keyboards and soft keypads). Physical keyboards and keypads may be wired, wireless or encased within (or forming part of) the personal computing device (such as with many laptops and hand held devices). With virtual keyboards and keypads, a visual representation of the keyboard or keypad (as the case may be) is displayed using a display device such as a computer monitor, LCD screen, touch sensitive screen, digital projector or some other display device for displaying images generated by a computing device. In certain cases with virtual keyboards and keypads, the display device also serves as a physical input interface for the user, such as with touch-sensitive screens. Moreover, in another aspect, keys formed on a physical keyboard-type device or displayed on a virtual keyboard-type device can be more generally referred to as a plurality of user input signal generators. In certain circumstances the plurality of user input signal generators comprise a plurality of physical keys. In other circumstances, the plurality of user input signal generators comprise a plurality of virtual keys. Virtual keys can be displayed on a display device or projected onto a display area (such as with holographic keyboards or keypads).

It will also be appreciated that while in the first embodiment the personal computing device 10 is a laptop, the aspects and features of the present invention may be practiced with a wide range of personal computing devices including personal computers, workstations, laptops, hand held computing devices including personal digital assistants and tablet PCs, computer terminal units and the like, and other electronic devices including mobile phones, Internet appliances (including home and office computers and TVs connected to the Internet), and embedded devices (including home and office devices), provided the aforementioned personal computing devices have or are operative with, directly or indirectly, a suitable graphical display device and a virtual or physical keyboard-type device receptive to user operation. Other types of equivalent personal computing devices to which the features and aspects of the present invention are applicable include, by way of example, an Internet appliance controlled via a virtual or physical keyboard-type device (for instance, running an Internet application though a television or other display device in association with a wireless keyboard).

With respect to the computer-readable medium 16 described above, it will be appreciated that software entities (for example, input management system 20 and second process 34) can be stored as computer-readable instructions on one or more types of computer-readable media including smart media, flash memory, a memory key such as a USB memory key, a hard disk drive, a network drive, a micro-drive, CD-ROM, CD-R, CD-RW, DVD (+/−R, +/−RW), optical disk, mini-disk, floppy disk, a ZIP disk, or some other computer-readable media, provided the computer-readable media is capable of storing computer-readable instructions and can operate as part of or in communication with the personal computing device 10.

For the purposes of the first embodiment, the operating system 22 installed on the personal computing device 10 is Windows XP™. However, the operating system 22 can be any operating system suitable for supporting the operation of the input management system 20 in connection with the applicable personal computing device. For example, for hand-held devices the operating system 22 can be an operating system suitable for the applicable hand-held device, such as, by way of example, Windows CE™, PocketPC™, EPOC™, PalmOS™, or an equivalent operating system. For larger personal computing devices, such as workstations, laptops or desktop computers, an operating system suitable for the applicable personal computing device may be used, such as, by way of example, Windows™ (including Windows XP™, Windows 2000™ or the like), MacOS™, UNIX™, Linux™, or the like.

System Flow

Figure 3:
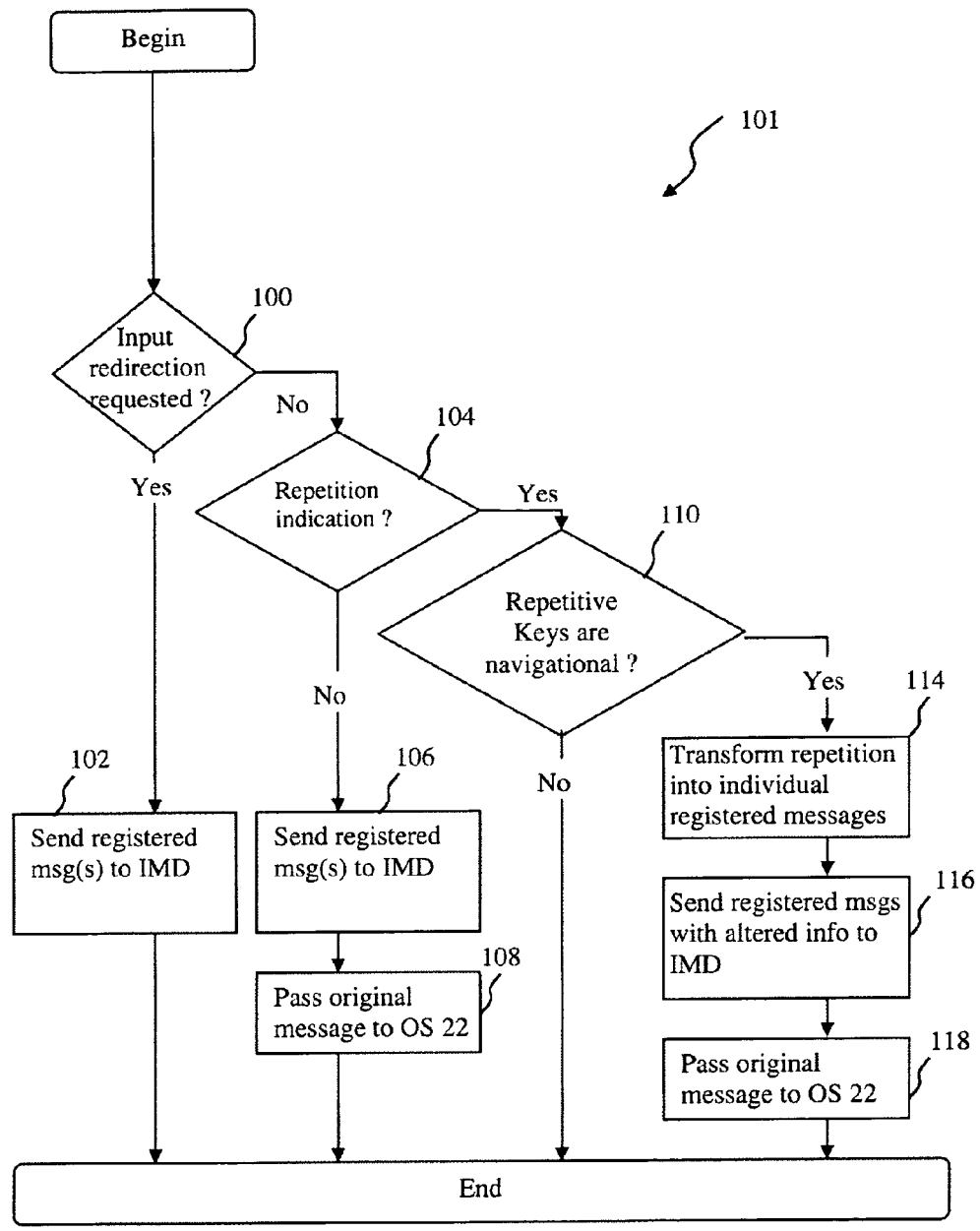
FIGS. 3 and 4 are flow diagrams illustrating the operation of an input management system in accordance with the first embodiment of the present invention.
Figure 4:
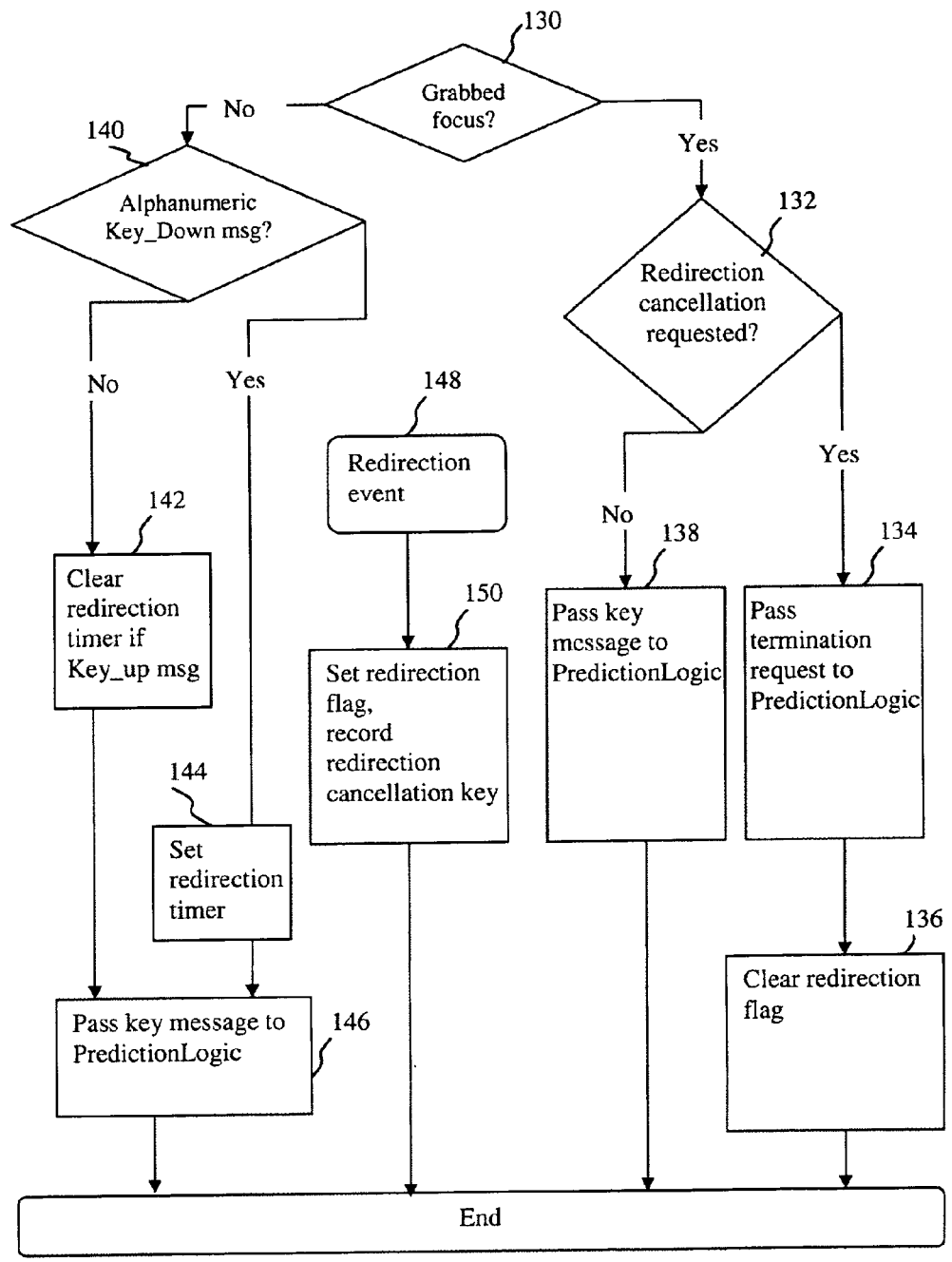

Referring to FIGS. 3 and 4, logical flow diagrams illustrate the operation of the input management system 20 shown in FIGS. 1 and 2.

In the discussion that follows, the word processor representing the first process 30 initially has system-level input focus and is therefore designated, in so far as the operating system 22 is concerned, to receive keyboard input. Redirection of keyboard input from the first process 30 to the second process 34 and back is handled by the input management system 20 based on the keyboard input received from the keyboard 14.1 and the state of the keyboard input when it is received.

In the first embodiment, when the predictive text entry system 34.1 (or more generally, the second process 34) is initially launched, the predictive text entry system 34.1 initializes the input management system 20. As part of this initialization, the input management system 20 calls functionality supplied by the operating system 22 so as to make the input management system 20 available to the operating system 22. For the first embodiment, where Windows XP™ is used, the Windows™ SetWindowsHookEx function is called so as to make the input management system 20 available to the operating system 22. In addition, the predictive text entry system 34.1 starts a system focus recorder 34.2 which is configured to monitor the system-level input focus associated with the operating system 22 on a reoccurring basis. The system focus recorder 34.2 starts a reoccurring timer loop which records the system-level input focus on a reoccurring basis every N number of milliseconds (where N represents a predetermined number of milliseconds, for example, 20 milliseconds). In the first embodiment, the system focus recorder 34.2 obtains the system-level input focus by invoking the GetFocus function provided by Windows XP™. With Windows XP™, system-level input focus is assigned to a particular window (for example, the first process 30 in the example shown in FIG. 1), and each window has a window handle associated with it. In recording the system-level input focus, the system focus recorder 34.2 keeps track of the current window handle of the window with system-level input focus (other than the window associated with the process in which the system focus recorder 34.2 resides). Thus, when invoked, the GetFocus function returns the window handle for the window that has system-level input focus. The predictive text entry system 34.1 (or more generally, the second process 34) uses this window handle to communicate with the process with system-level input focus, which in the first embodiment is the first process 30.

The input management system 20 monitors user input stream 24 for keyboard input received by the personal computing device 10 from the keyboard 14.1. In the first embodiment, the keyboard input is received by the personal computing device 10 in the form of scan codes associated with the applicable key on the keyboard 14.1, which the user has selected and then deselected. As indicated earlier, in response to the selection of a key on the keyboard 14.1, a particular scan code is generated by the keyboard 14.1, which is translated by the operating system 22 into a virtual key code for use by one or more processes using the operating system 22.

In response to receiving a virtual key code, the input management system 20 checks at block 100 to see if a request for keyboard input redirection has been previously received by the input management system 20 from another process. More generally, block 100 involves evaluating whether the occurrence of a first predefined input key event has taken place.

In the first embodiment, from the user's perspective, a redirection request occurs when the user selects an alphanumeric key on keyboard 14.1 for a sufficient period of time to cause a redirection timer to reach the predetermined time period $T_1$. From the perspective of the programming logic in the first embodiment, requests for the redirection of keyboard input are made to the input management system 20 by an input management director 34.3 embedded in the predictive text entry system 34.1. The input management director 34.3 is configured to identify when a redirection event has occurred and to set a redirection flag in the input management system 20 when the redirection event is identified. The input management director 34.3 is also operative to pass keyboard input received from the input management system 20 on to the predictive text entry system 34.1 for further processing. The operation of the input management director 34.3, including when it passes keyboard input on to the predictive text entry system 34.1 is discussed further below.

The processing at block 100 involves checking to see whether the redirection flag in the input management system 20 has been set (e.g. if the redirection flag has been set to "ON" or "ACTIVE"). In the first embodiment, a redirection timer associated with the redirection flag is used by the input management director 34.3 to set the redirection flag. When the redirection timer fires, the input management director 34.3 is configured to set the redirection flag so that it is "ON". The redirection timer fires when it has reached the predetermined time period $T_1$. Preferably, the redirection flag takes the form of a coding variable in the input management system 20. The setting and resetting of the redirection flag is discussed in further detail below.

Figure 5:
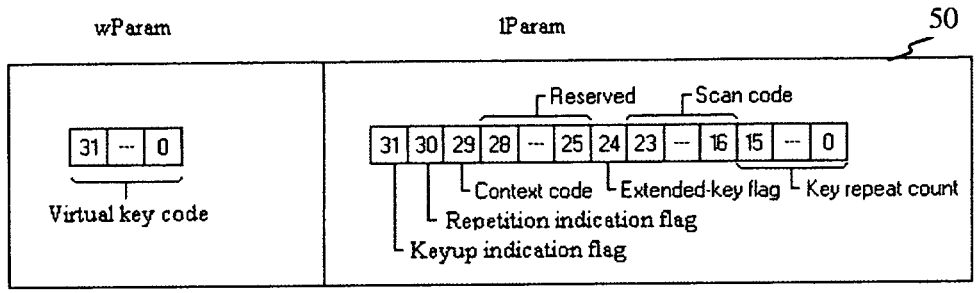
FIG. 5 is a block diagram of a data structure for a keyboard message used in connection with the first embodiment.

If the input management system 20 determines at block 100 that it has previously received a redirection request for keyboard input from another process (in this case, the input management director 34.3), then processing proceeds to block 102 where the virtual key code and the related information regarding the state of the associated key are sent as a registered message (more generally, a keyboard message) to the input management director 34.3 for further processing (discussed in further detail below in the context of FIG. 4). The registered message sent at block 102 to the input management director 34.3 comprises (1) the virtual key code for the key currently selected on the keyboard 14.1 (the selected key), (2) the scan code associated with the selected key and received from the keyboard 14.1, and (3) the Key_Down indication (in the form of a Key_Down flag) associated with the selected key. For illustration purposes, a data structure 50 representing the registered message sent to the input management director 34.3 is shown in FIG. 5. Note that the use of registered messages, above and in what follows, is a feature of Windows XP™ in the first embodiment. Registered messages are sent from one process to another process in the first embodiment using the PostMessage function provided by Windows XP™. More generally, keyboard messages that are not "registered messages" (such as is used by Windows XP) may be used in operating systems that do not require the use of registered messages. Furthermore, in other operating systems, other mechanisms supported by those operating systems can be used, such as shared memory.

Once the input management system 20 sends the registered message at block 102 to the input management director 34.3, the input management system 20 waits to receive further keyboard input.

If the input management system 20 determines at block 100 that it is not in a state where it has been configured to initiate redirection of keyboard input to the input management director 34.3, then processing proceeds to block 104. At block 104 the input management system 20 evaluates whether the keyboard input currently received has a repetition indication associated with it. The keyboard input currently received will have a repetition indication associated with it if the key associated with such keyboard input has been selected for a period of time sufficient to active the automated repeat feature of the keyboard device driver. If the answer to the evaluation at block 104 is "NO", then processing proceeds to block 106 where a copy of the keyboard input is sent, in the form of a registered message, to the input management director 34.3 which in this case will pass the copy of the keyboard input on to the predictive text entry system 34.1 at block 146 (note that in the drawings the predictive text entry system 34.1 is referred to as PredictionLogic). This action is taken in the first embodiment so as to allow the predictive text entry system 34.1 to update its predictive engine. In order for the predictive engine to predict completion candidates preferably on an ongoing basis, the predictive text entry system 34.1 needs to be kept informed of the keyboard inputs received by the personal computing device 10 in association with the first process 30 (in this case, Microsoft™ Word™), whether or not a redirection request has been made or acted upon. Thus, keyboard input is forwarded by the input management system 20 to the predictive text entry system 34.1 in order to update that application's prediction engine, even while the first process 30 (Microsoft™ Word™) has both the system-level input focus and the logical input focus. This feature is particular to the operation of the predictive text entry system in the first embodiment. In other embodiments, where the second process 34 is a function expanding process that does not need to know substantially all of the keyboard input received in association with the first process 30, transmitting a copy of the keyboard input to the second process 34 at block 106 or another block in association therewith need not take place.

In the first embodiment, using Windows XP™, the keyboard input sent at block 106 to the input management director 34.3 is sent as a registered message, as described above, using the PostMessage function provided by Windows XP™.

While a copy of the keyboard input is sent in the first embodiment at block 106 to the input management director 34.3 so that it may be passed on to the predictive text entry system 34.1 at block 146, the original keyboard input itself is passed on at block 108 to a chain of monitoring processes, handled by the operating system 22, where once the original keyboard input has been processed through the chain of processes (if any), the original keyboard input is delivered to the first process 30, provided that the monitoring processes in the chain did not process the original keyboard input themselves. If the chain of monitoring processes is empty, then the input management director 34.3 instructs the operating system 22 to pass the original keyboard input on to the first process 30. In the first embodiment, the original keyboard input is passed on to the chain of monitoring processes by calling the CallNextHookEx function provided by Windows XP™.

If the input management system 20 determines at block 104 that the keyboard input currently received has a repetition indication associated with it, processing proceeds to block 110. At block 110, the input management system 20 checks to see whether the keyboard input currently received represents a key from a set of predefined keys whose repetition the input management system 20 is configured not to use as a redirection instruction (referred to here as "non-redirectional repetitive keys"). In the first embodiment, the input management system 20 is configured to recognize non-alphanumeric keys as non-redirectional repetitive keys, such as the arrow keys, the Backspace key, the Control key, the Shift key, the Alt key, the Del key, and the like.

If the keyboard input currently received is determined at block 110 to be a non-redirectional repetitive key, then processing proceeds to blocks 114, 116 and 118. Blocks 114, 116 and 118 provide a mechanism for arranging to have the keyboard input currently received sent to the first process 30 and for arranging to have a copy of the keyboard input currently received sent to the predictive text entry system 34.1 notwithstanding the fact that input management system 20 has identified a repetition indication in association with the keyboard input currently received.

At block 114, the input management system 20, preferably in the monitoring module 28, transforms the non-redirectional repetitive key into individual keystroke events. Before the transformation, the non-redirectional repetitive key is represented by a keyboard message comprising (1) the virtual key code for the selected key, (2) the scan code associated with the selected key and received from the keyboard 14.1, (3) the Key_Down indication (in the form of a Key_Down flag) associated with the selected key, (4) a repetition indication (in the form of a ON/OFF flag), and (5) a repetition number indicating the amount of repetitions collected by the keyboard 14.1 before the input management system 20 was notified). The transformation at block 114 transforms the keyboard message representing the non-redirectional repetitive key into at least one pair of registered messages, with each registered message within the pair comprising the same information as the keyboard message except that (1) the repetition indication information is not stored by either registered message in the pair, and (2) the first registered message in the pair contains the Key_Up indication and second registered message in the pair contains the Key_Down indication.

At block 116 the registered messages generated at block 114 are sent to the input management director 34.3, which passes the registered messages to the input management director 34.3 to be passed on to the predictive text entry system 34.1 for further processing.

At block 118, the original keyboard input currently received is passed on, in the same manner described with respect to block 108, to a chain of monitoring processes, where the original keyboard input currently received will be delivered to the first process 30 (Microsoft™ Word™), provided that the monitoring processes in the chain did not process the original keyboard input themselves.

Following block 118, processing by the input management system 20 of the keyboard input currently received ends and the input management system 20 waits to receive the next keyboard input.

Referring back to block 110, if the keyboard input currently received is determined at block 110 to not be a non-redirectional repetitive key, the current keyboard input is not sent on to either the first process 30 or to the predictive text entry system 34.1, but is instead simply ignored (effectively removing the current keyboard input) and the input management system 20 waits to receive the next keyboard input. In this way, the input management system 20 is configured in the first embodiment to remove, from keyboard input intended for the first process 30, any repeated entries of an alphanumeric key that would ordinarily result in input within a Microsoft™ Word™ document when an alphanumeric key is held down for a sufficient period of time. The repeated entries of an alphanumeric key (but not the first instance of the key itself before the repetition takes place) are removed from the input stream sent to the first process 30 in order to set up the first process 30 to a predetermined input state wherein the first instance of the alphanumeric key has been received and the further repeated instances of the alphanumeric key arising from continued selection of the alphanumeric key have not been received. This provides a consistent predetermined input state for the current application represented by the first process 30, advantageously allowing the predictive text entry system 34.1 (where predictive text entry is used) to know what the input state was for the first process 30 just before redirection occurred.

Setting the Redirection Timer

Once the input management director 34.3 receives the copy of the keyboard input sent by input management system 20, the input management director 34.3 will set the redirection timer in order to monitor for redirection requests with respect to future keyboard input. The setting of the redirection timer is described in further detail below with reference to blocks 140 and 144 (see FIG. 4).

Referring to FIG. 4, the input management director 34.3 is configured to check whether the second process 34 (in the first embodiment, predictive text entry system 34.1) has been assigned logical input focus at block 130. In the first embodiment, this is carried out by testing whether the redirection flag has been set to "ON". This check is performed when keyboard input is received by the input management director 34.3 from the input management system 20. If the answer to this question at block 130 is "YES" then processing proceeds to block 132 where the keyboard input state is checked for the redirection cancellation key. In the first embodiment, the "redirection cancellation key" refers to the last key recorded (at block 150) when the redirection timer fired (as represented by block 148). The input state of the redirection cancellation key is used by the input management director 34.3 to determine when further redirection of keyboard input is to take place (in the first embodiment, redirection back to the first process 30).

The input management director 34.3 monitors for a redirection event using the redirection timer. A redirection event occurs when the redirection timer fires (ie. reaches predetermined time period $T_1$). Once the redirection timer fires (identified in block 148 as a redirection event) the input management director 34.3 assigns logical input focus to the predictive text entry system 34.1 and records the redirection cancellation key. In the first embodiment, the redirection cancellation key is the last keyboard input received from the keyboard 14.1 when the redirection timer fired. The last keyboard input received is recorded at block 150 so that a further indication of redirection (a further redirection event) can be identified. The further redirection event is an indication of when logical input focus needs to be redirected back to the first process 30. With the recordation of last keyboard input received when the redirection timer fired, the input management director 34.3 can determine (at block 132, as discussed above) when the further redirection event occurs so that steps can be taken to redirect keyboard input back to the first process 30.

In the first embodiment, logical input focus is assigned to the predictive text entry system 34.1 by the input management director 34.3 setting the redirection flag, located in the input management system 20, to "ON" at block 150. With the redirection flag set to "ON", the logical input focus is assigned to the predictive text entry system 34.1.

For the first embodiment the selection of the space bar key on the keyboard 14.1 for the predetermined time period $T_1$ is used as one of the triggers for a redirection event. While this is not necessary for all embodiments, where this is carried out in the first embodiment, then through the operation of the input management system 20 the virtual key code for the space bar will be sent on to the first process 30 even in instances where the user intended only to use the space bar as a trigger to invoke the functionality of the predictive text entry system 34.1. To resolve this issue, at block 150 the input management director 34.3 backs out of an instance of the space bar entry sent to the first process 30 if the redirection event was triggered by the selection of the space bar.

Note that once logical input focus is assigned to the predictive text entry system 34.1, if the keyboard input state for keyboard input received by the input management director 34.3 indicates a Key_Up state, then this is an indication that a key selected by the user is being released. If the key selected by the user is being released (which is interpreted as an indication of a further redirection event), then in the first embodiment this means that redirection cancellation has been requested, in which case the logical input focus assigned to the predictive text entry system 34.1 is released and reassigned to the first process 30. In this case, when a selected key is identified at block 132 as being released (or deselected), processing proceeds to blocks 134 and 136 where the input management director 34.3 is configured to pass the redirection cancellation request (also referred to as a termination request) to the predictive text entry system 34.1 (also referred to as PredictionLogic) and to set the logical input focus to the first process 30 by setting the redirection flag to "OFF" (i.e. the redirection flag located in the input management system 20 is cleared). In response to being passed the redirection cancellation request, the predictive text entry system 34.1 is configured to terminate the availability of the selection functionality provided by the predictive text entry system 34.1 while it is assigned logical input focus and to send the selected completion candidate (if any has been selected by the user using the predictive text entry system 34.1 while it was assigned logical input focus) to the last recorded process 30 that previously received keyboard input.

Referring back to block 132, if the input management director 34.3 determines that there has not been a redirection cancellation request, then processing proceeds to block 138 where the keyboard input received is passed on in the form of a key message to the predictive text entry system 34.1 for further processing. The key message comprises information associated with the keyboard input received, including the (1) the virtual key code for the key currently selected on the keyboard 14.1 (the selected key), (2) the scan code associated with the selected key and received from the keyboard 14.1, and (3) an indication of the input state of the selected key (a Key_Down indication).

Figure 6:
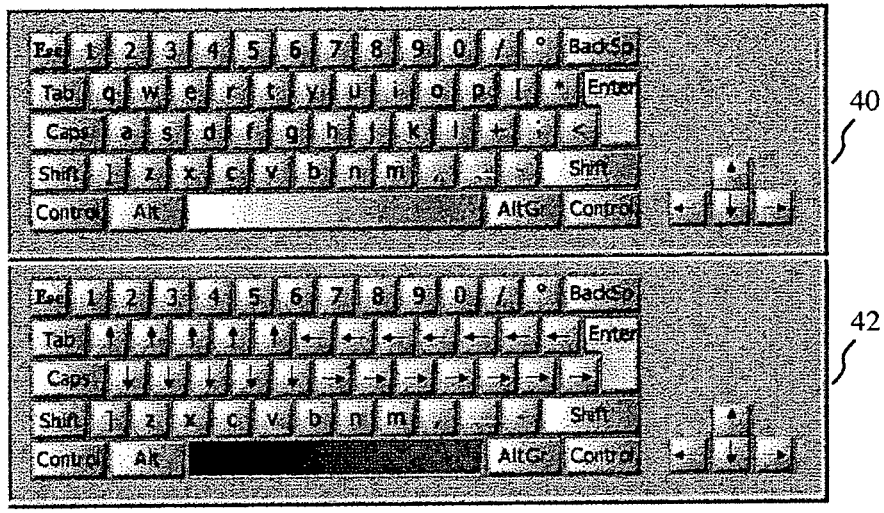
FIG. 6 is a block diagram illustrating operation of a keyboard when keyboard input is redirected to a second process, according to the first embodiment of the invention.

In response to receiving the key message passed by the input management director 34.3 at block 138, the predictive text entry system 34.1 invokes the applicable expanded functionality of the predictive text entry system 34.1 available in association with the particular keyboard input received. For instance, with reference to FIG. 6, when the "space bar" keyboard input is received by the predictive text entry system 34.1 while the predictive text entry system 34.1 has logical input focus, the predictive text entry system 34.1 is configured to allow for use of alphanumeric keys on the keyboard as navigational keys to navigate one or more lists of completion candidates while the space bar remains selected. In the first embodiment, the selection of the "space bar" (where the space bar is shown selected at block 42) for a period of time sufficient to have the redirection timer fire (reach or exceed $T_1$) results in logical input focus being assigned to the predictive text entry system 34.1 for so long as the space bar remains selected. While the predictive text entry system 34.1 continues to have logical input focus in this case, other alphanumeric keys can be used according to their enhanced functionality as made available by the predictive text entry system 34.1. For illustration purposes, a summary of the enhanced functionality of the alphanumeric keys in association with the predictive text entry system 34.1 is set out below:

'a', 's', 'd', 'f', and 'g' keys behave as the down arrow key, which are used to select the next member from the list of completion candidates supplied by the predictive text entry system 34.1 and displayed in a graphical user interface;

'q', 'w', 'e', 'r', and 't' keys behave as the up arrow key, which are used to select a previous member from the list of completion candidates supplied by the predictive text entry system 34.1 and displayed in a graphical user interface;

'h', 'j', 'k', 'l', ';' and "'" keys behave as the right arrow key, which are used to activate the current selected completion candidate in the aforementioned list of completion candidates; and 'y', 'u', 'i', 'o', and 'p' keys behave as the left arrow key, which are used to undo or correct the recent activation of a completion candidate in the aforementioned list of completion candidates.

Figure 7:
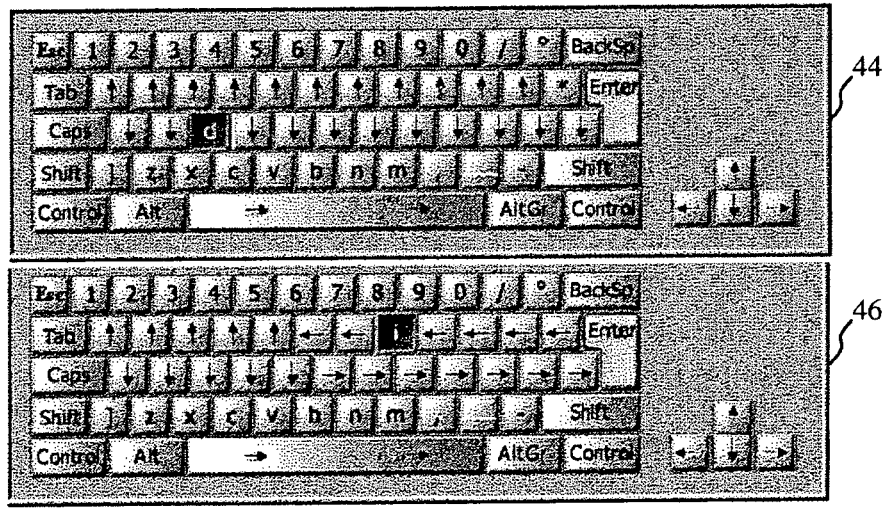
FIG. 7 is a block diagram illustrating another form of operation of a keyboard when keyboard input is redirected to a second process, according to the first embodiment of the invention.

Similarly, when another alphanumeric key, other than the space bar, such as the letter "d" or "i" (see block 44 of FIG. 7), is selected for a period of time sufficient to have the redirection timer fire (i.e. reach or exceed $T_1$), the logical input focus will switch from the first process 30 to the predictive text entry system 34.1 and the enhanced functionality provided for alphanumeric keys by the predictive text entry system 34.1 becomes available to the user. This is illustrated in FIG. 7. In general, the alphanumeric keys, other than the alphanumeric key that triggered the switch of logical input focus to the predictive text entry system 34.1, may be used according to the enhanced functionality provided for in association with such alphanumeric keys by the predictive text entry system 34.1 while the predictive text entry system 34.1 continues to have logical input focus.

Referring back to block 130 of FIG. 4, if the input management director 34.3 determines at block 130 that the predictive text entry system 34.1 has not been assigned logical input focus when keyboard input is received, then processing proceeds to block 140. At block 140 the input management director 34.3 determines whether, based on the state of the keyboard input currently received, the redirection timer should be started. If the keyboard input currently received is determined at block 140 to have a keyboard input state indicating that a key has been selected, then the redirection timer is started at block 144. In the first embodiment, the keyboard input currently received has a keyboard input state indicating that a key has been selected when the Key_Down state is identified in connection with the keyboard input currently received. Once the redirection timer is commenced, the keyboard input currently received is, at block 146, passed on in the form of a key message to the predictive text entry system 34.1 for processing by the predictive engine of the predictive text entry system 34.1 in order to keep the prediction engine up-to-date with the keyboard input being received from the keyboard 14.1.

Note more generally that the redirection timer is activated (started) when a key on the keyboard 14.1 is selected (a Key_Down event) and, once activated, the redirection timer is deactivated (cleared) once a Key_Up event is received in association with the same key that initiated the activation of the redirection timer.

If the keyboard input currently received by the input management director 34.3 is determined at block 140 to not have a keyboard input state indicating that a key has been selected, then the redirection timer is cleared at block 142 if the keyboard input state is identified as Key_Up. Following block 142, the keyboard input currently received is, at block 146, passed on in the form of a key message to the predictive text entry system 34.1 for processing by the predictive engine of the predictive text entry system 34.1 in order to keep the prediction engine up-to-date with the keyboard input being received from the keyboard 14.1.

It will be noted that for the embodiment illustrated the second process 34 serves as a function expander, providing additional functionality relevant to the operation of the first process 30. While the second process 34 has logical input focus, the user is able to make use of the additional functionality provided by the second process 34 to enhance the use of the first process 30 in ways that would not otherwise be available without the presence of the second process 34. From a programming perspective, using the input management system 20 and the input management director 34.3 as a mechanism to redirect keyboard input to the second process 34 so that additional functionality can be accessed and used by the user in connection with the first process 30 enables the programming framework to be highly adaptive to a wide range of function enhancing (or function adding) processes (such as predictive text entry system 34.1) configured to provide additional functionality in association with the first process 30. With this approach, additional function enhancing processes can be configured independent of the process that is to have its functionality enhanced (the target process, i.e. the second process 34), preferably without having to modify the programming code of the target process or application in question.

In the first embodiment, as described above, the user will continue to have access to the additional functionality of the predictive text entry system 34.1 (or more generally, the second process 34) provided the user continues to keep the input key on the keyboard 34.1 selected that was used to invoke redirection of the keyboard input to the predictive text entry system 34.1. Once the user deselects the selected key that triggered redirection of the keyboard input to the predictive text entry system 34.1, the input management system 20 is configured to redirect further keyboard input to the first process 30 and the functionality of the predictive text entry system 34.1 controllable from the keyboard 14.1 becomes, from the user's perspective, temporarily unavailable, at least until keyboard input is once again redirected to the predictive text entry system 34.1.

In certain cases, it may be tiring to a user to have to keep the key that triggered redirection selected in order to maintain access to the functionality of the predictive text entry system 34.1. To address this issue where it may be desired, in a variation to the first embodiment the key that triggered the redirection of keyboard input to the predictive text entry system 34.1 (or more generally the second process 34) need not remain selected in order for the user to maintain access to the functionality of the predictive text entry system 34.1 once keyboard input has been redirected to the predictive text entry system 34.1. In this variation, the input management system 20 and the input management director 34.3 are configured to continue redirecting keyboard input to the predictive text entry system 34.1 until the input management director 34.3 receives keyboard input in the form of a predetermined key entry or sequence that is recognized as an instruction from the user to redirect keyboard input back to the first process 30 (or to another third process). In this variation, logical input focus, once assigned to predictive text entry system 34.1 would not be reassigned to the first process 30 unless the predetermined key entry or sequence was identified by the input management director 34.3. In this way, the user can continue to use the enhanced functionality of the predictive text entry system 34.1 without having to keep the key selected that triggered redirection of keyboard input to the predictive text entry system 34.1. An embodiment of this variation is illustrated with reference to FIGS. 3 and 17 (where FIG. 17 is a variation of FIG. 4).

Figure 17:
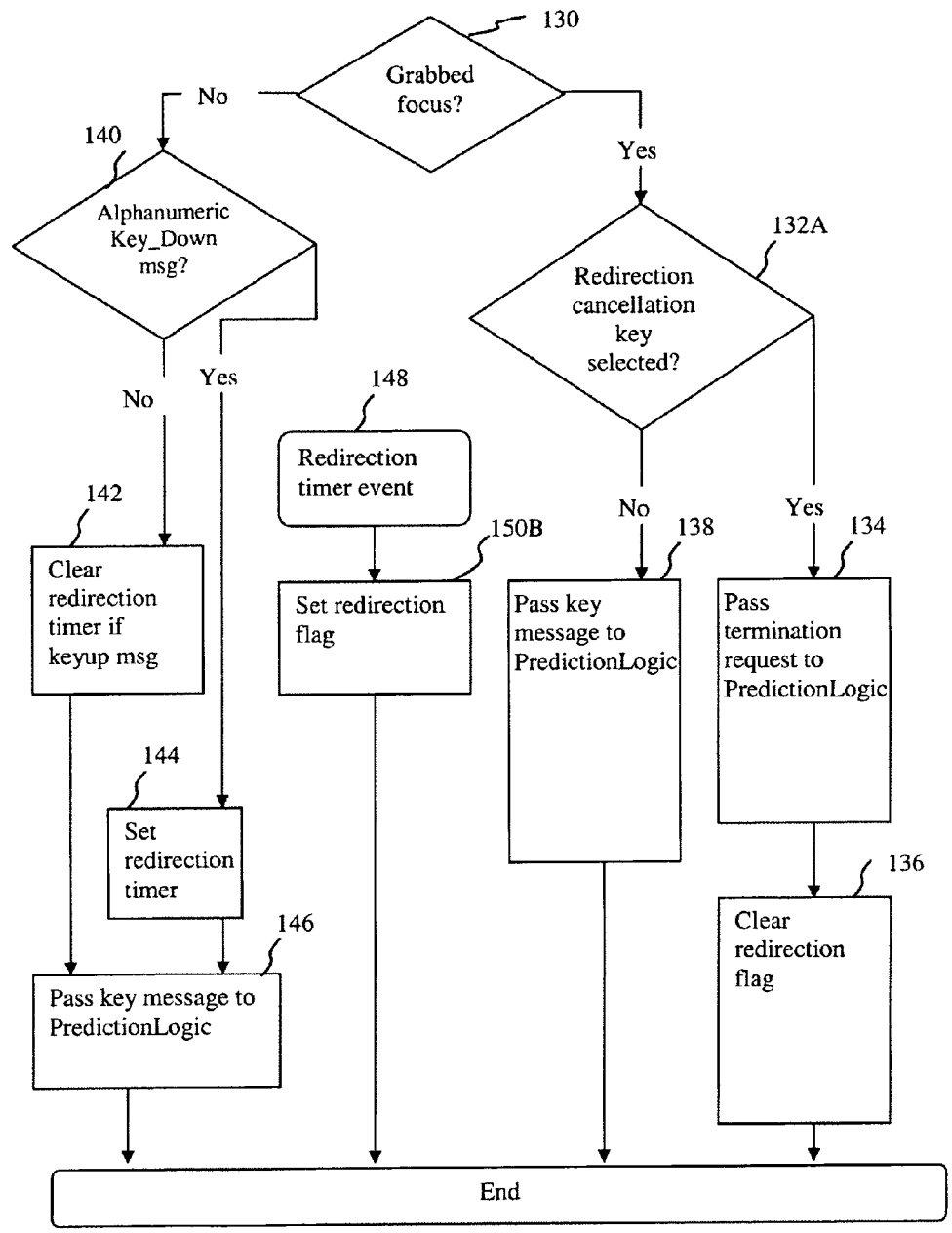

The particular embodiment illustrated with FIGS. 3 and 17 operates largely in the manner described above for the first embodiment (with reference to FIGS. 3 and 4). However, in the embodiment illustrated with FIGS. 3 and 17, the input management director 34.3 is configured to recognize selection of a predetermined key entry as an indication of a redirection cancellation command at block 132A. In this case, it is the identification of the new selection of the predetermined entry key (i.e. in a Key_Down state), after redirection to the predictive text entry system 34.1 has taken place, that results in processing to proceed to blocks 134 and 136 where the input management director 34.3 is configured to pass the redirection cancellation request (also referred to as a termination request) to the predictive text entry system 34.1 (also referred to as PredictionLogic) and to set the logical input focus to the first process 30 by setting the redirection flag to "OFF". In response to being passed the redirection cancellation request, the predictive text entry system 34.1 is configured to terminate the availability of the selection functionality provided by the predictive text entry system 34.1 while it is assigned logical input focus and to send the selected completion candidate (if any has been selected by the user using the predictive text entry system 34.1 while it was assigned logical input focus) to the last recorded process (e.g. the first process 30) that previously received keyboard input. Note with variation shown in FIG. 17 it is not necessary to record the pressed last key pressed at block 150B (a variation of block 150 in FIG. 4) since a predetermined redirection cancellation key is used.

Additional Aspects and Features

The input management system 20 can include a variety of aspects and features to further enhance functionality and flexibility for the user, in addition to the various aspects and features discussed above in this specification. Furthermore, as with the aspects and features described above with reference to the earlier embodiments, each of the following aspects and features individually provides a beneficial enhancement and is an embodiment of the present invention. These additional aspects and features will now be described below.

As before, the following aspects and features can be applied to or used with many types of personal computing devices and can be stored as computer-readable instructions in one or more types of computer-readable media.

Context Sensitive Approach with Multiple Function Expanders

Figure 8:
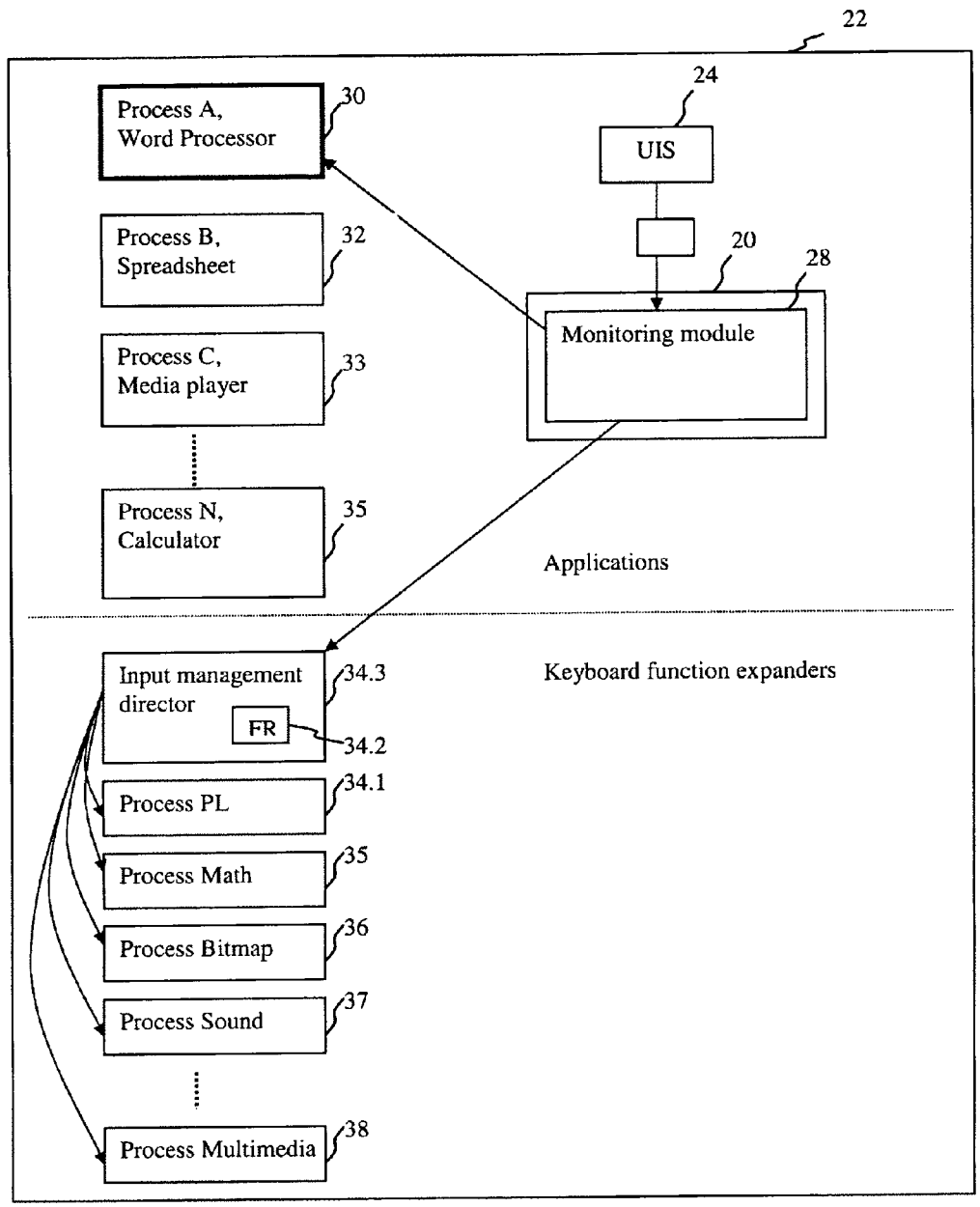
FIG. 8 is a block diagram of an input management system in use in association with a first process and a second process, according to another embodiment of the invention.
Figure 9:
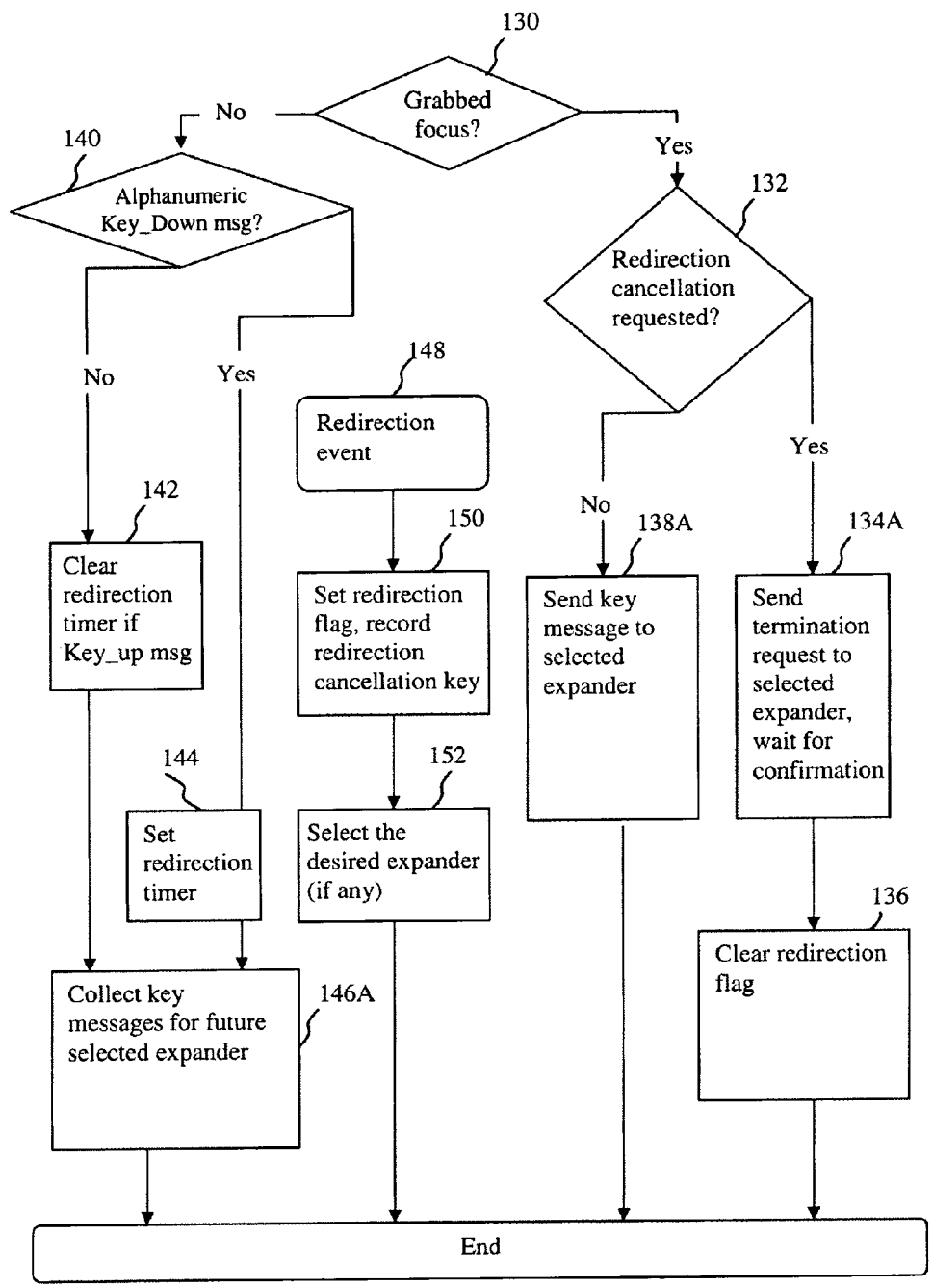
FIGS. 9 and 10 are flow diagrams illustrating the operation of an input management system in accordance with the embodiment of the present invention shown in FIG. 8.
Figure 10:
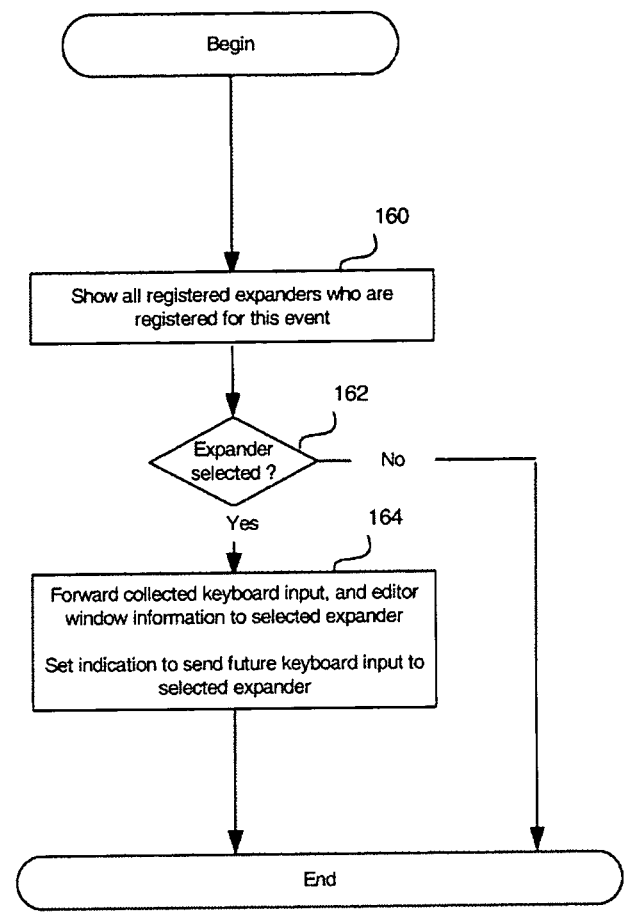

Referring to FIGS. 8, 9 and 10, there is shown a further embodiment. In this further embodiment, there is shown a context-sensitive mechanism for redirection of input from a keyboard-type device in which the mechanism is adapted for use with multiple function expander processes (illustrated by processes 34.1, 35, 36, 37 and 38). In this case, the input management director 34.3 operates in the manner described above with reference to the first embodiment (see FIG. 3), with registered messages comprising information associated with keyboard input being sent to the input management director 34.3 at the equivalent of blocks 102, 106 and 116 of FIG. 3.

Referring to FIG. 9, the input management director 34.3 monitors for a redirection event block 148. As with the first embodiment, a redirection timer is used, which is activated at block 144 when an alphanumeric key is identified at block 140 with a Key_Down state. In the embodiment shown in FIGS. 8, 9 and 10, the input management director 34.3 collects information associated with keyboard input, such as the virtual key code and the input state (Key_Up or Key_Down), at block 146A so that the collected information can be sent to an expander process once a redirection event occurs (block 148) and such an expander process is selected to receive the collected information, as described below.

Figure 11:
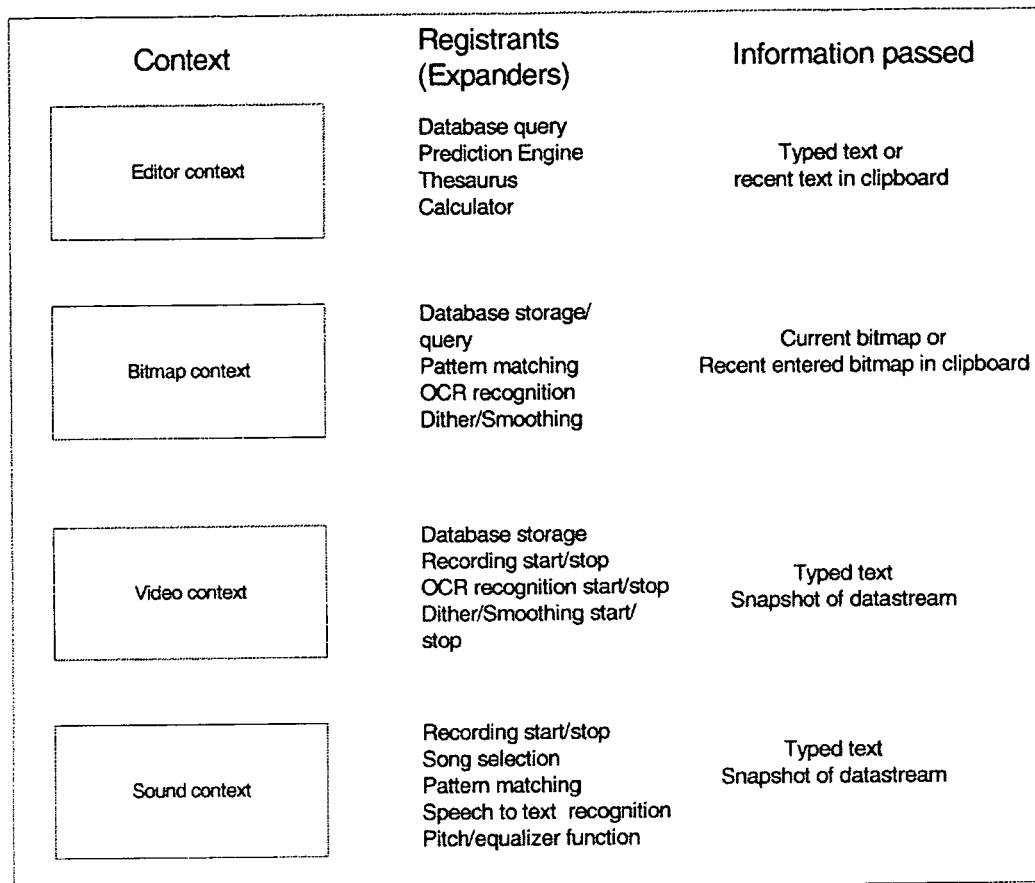
FIG. 11 is a block diagram illustrating an arrangement of registered expander processes, in accordance with the embodiment of the present invention shown in FIG. 8.

Once the redirection timer is activated at block 144 and the input management director 34.3 detects a redirection event at block 148, this results in the redirection flag being set to "ON" and the redirection cancellation key being recorded at block 150. In addition, at block 152 processing proceeds to block 160 in FIG. 10 where the input management director 34.3 checks for and displays registered expanders with an interest in the detected redirection event. More particularly, at block 160 the input management director 34.3 checks to see whether the detected redirection event associated with the selected key has been flagged by one or more registered expanders as an indication that the keyboard input can be redirected to those one or more registered expanders. An example of a lookup table listing registered expanders is shown in FIG. 11. Registered expanders that have flagged the detected redirection event as an indication that the keyboard input can be redirected to those one or more registered expanders are also referred to here as registered expanders that have an interest in the detected redirection event. If any registered expanders are found with an interest in the detected redirection event, then they are displayed at block 160 in a user interface for potential selection by the user. At block 162 the input management director 34.3 monitors whether or not the user has selected one of the registered expanders displayed, and if a user selection of one of the displayed registered expanders is identified, processing proceeds to block 164 where the collected information associated with keyboard input is passed on to the selected expander process and a flag is set directing the input management director 34.3 to send future keyboard input to the selected expander process until a redirection cancellation request is identified, leading to the processing at blocks 134A and 136. At block 134A, a termination request is sent to the selected expander instructing the selected expander that it will no longer have logical input focus. The input management director 34.3 also preferably waits for a confirmation instruction from the selected expander, confirming that the termination request has been received. Waiting for the confirmation instruction provides the selected expander with time to conclude its use of the keyboard input in an orderly manner.

In yet another variation, where multiple expander processes are used (such as illustrated in FIG. 8), the redirection cancellation key associated with the applicable expander process to which redirection has occurred can be determined by looking (such as at block 160 of FIG. 10) at a lookup table or the like for the redirection cancellation key associated with the applicable expander. In this further variation, each expander process can register with the input management system 20 so that the redirection cancellation key applicable to each particular expander process can be recorded in a lookup table or the like. This can be done, for instance, by expanding the table in FIG. 11 to include a field for each registered expander which indicates a predetermined redirection cancellation key associated with the respective registered expander. In this way, various redirection cancellation keys (the same or different) can be used to bring redirection of keyboard input to a particular expander process to an end.

Figure 12:
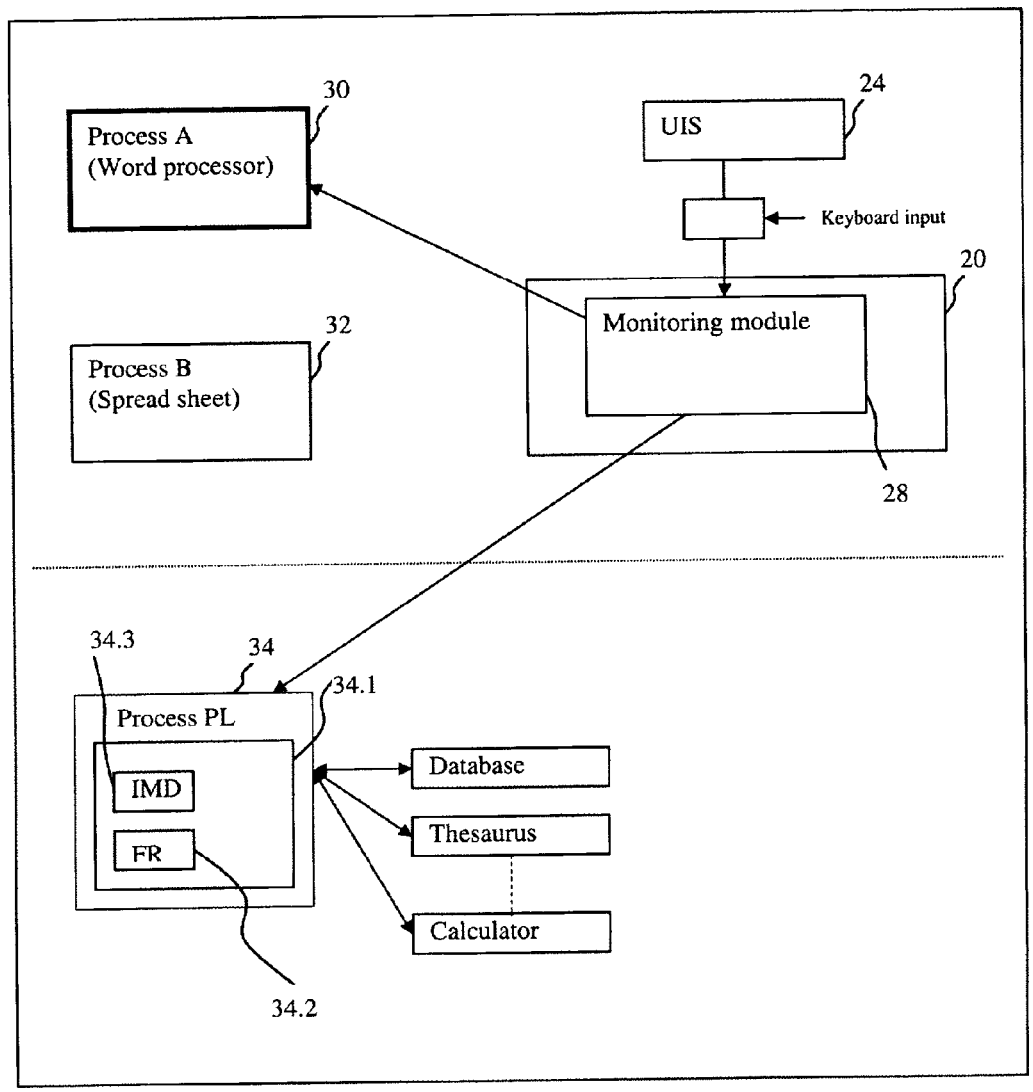
FIG. 12 is a block diagram illustrating yet another embodiment of the invention.

In another variation of the embodiment shown in FIGS. 8, 9 and 10, the predictive text entry system 34.1 (or more generally, the second process 34) is configured to provide an interface to multiple expander processes potentially available for user selection, as illustrated in FIG. 12.

Key-Based Repetition Indications

Figure 13:
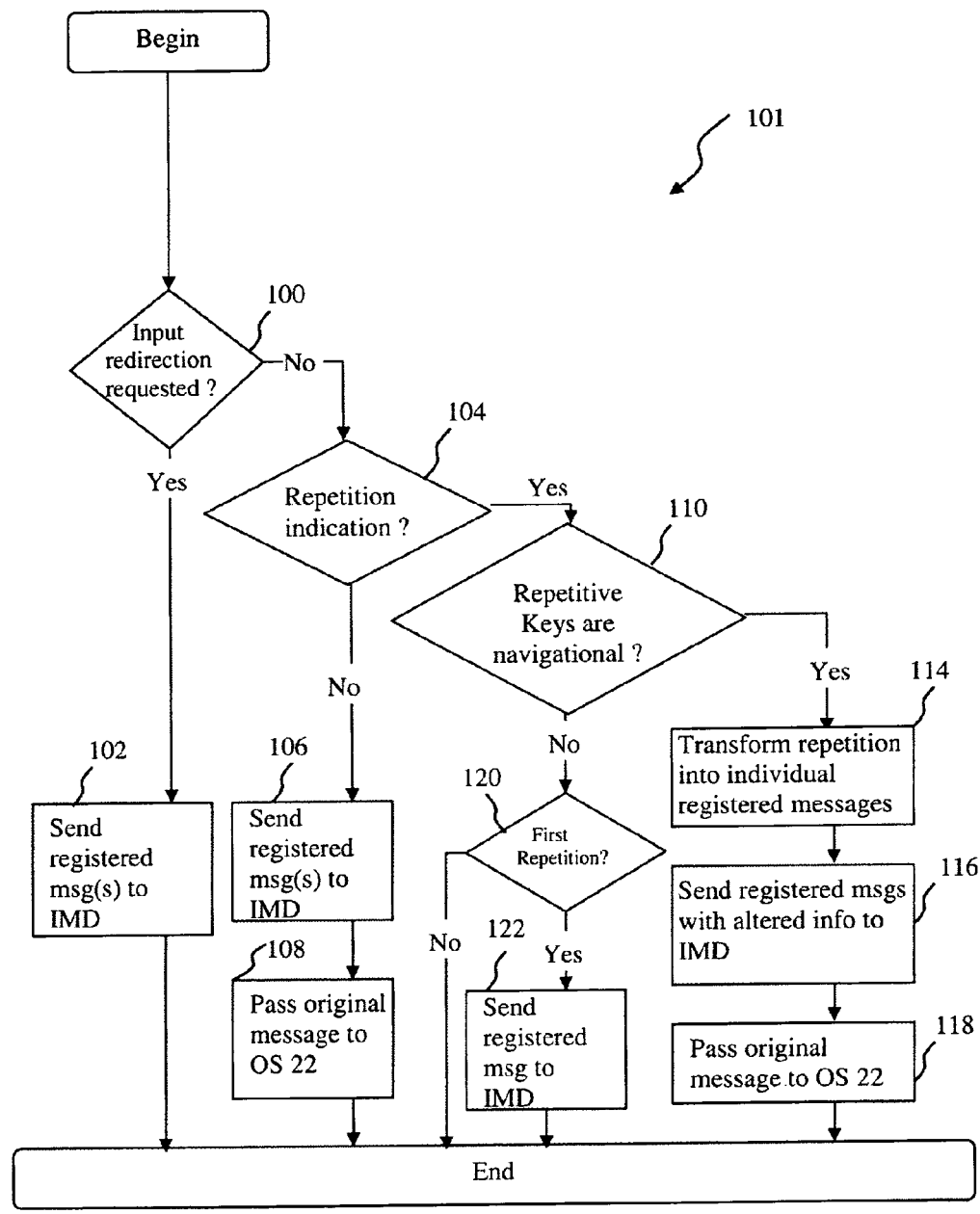
FIGS. 13 and 14 are flow diagrams illustrating the operation of an input management system and an input management director in accordance with another embodiment of the present invention.
Figure 14:
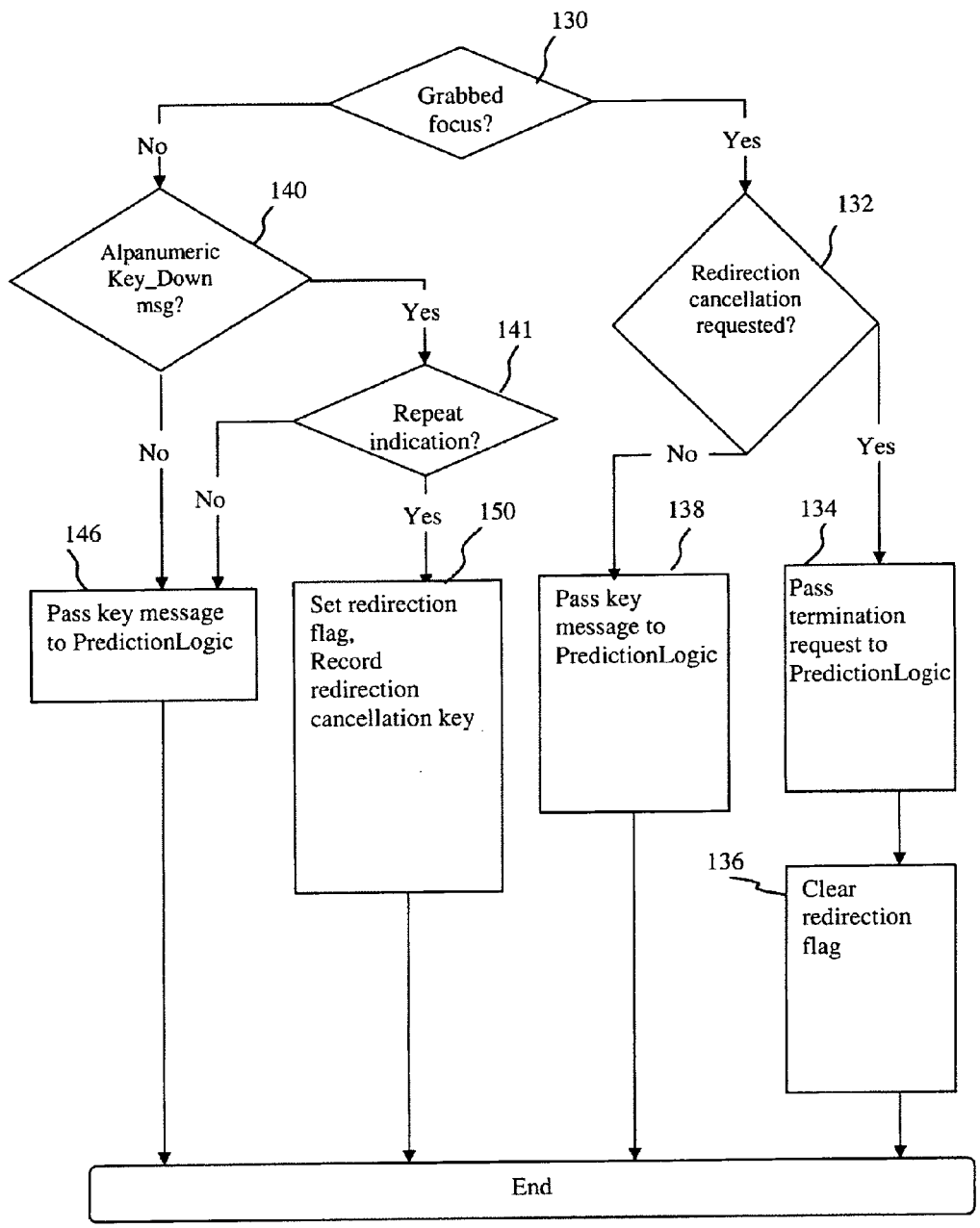

Referring to FIGS. 13 and 14, there is shown yet a further embodiment. In this further embodiment, the input management system 20 (FIG. 1) uses the logical input focus mechanism described earlier in this specification in order to direct and redirect the keyboard input from one process to another. However, in the further embodiment shown in FIGS. 13 and 14 the input management system 20 uses the repetition indications associated with the keyboard input events (or more generally, input key events) to determine whether or not a redirection request has been made, rather than the redirection timer technique described in the first embodiment. Thus, when a key on the keyboard 14.1 remains selected for a sufficient period of time, an automated repeat feature is activated and the key received by the operating system 22 is flagged with a repetition indication. This can be done, for example, either by the operating system 22, using for example the applicable keyboard device driver, or by the keyboard 14.1 itself (in which case the key and the associated repetition indication are then interpreted by the applicable keyboard device driver).

When keyboard input is received by the input management system 20 it is processed in a manner similar to that described in the first embodiment. However, if the keyboard input received has been flagged with a repetition indication, then, in this further embodiment, at block 120 of FIG. 13, the input management system 20 determines whether or not the keyboard input received and flagged with the repetition indication is the first repeated instance of the keyboard input. For greater certainty, in this further embodiment the first repeated instance of a keyboard input occurs when the same keyboard input is received for the second time in a row by the input management system 20 but now flagged with the repetition indication. If the keyboard input received is the first repeated instance of that keyboard input, then processing proceeds to block 122 where a registered message associated with the keyboard input is sent to the input management director 34.3. In this case, the registered message sent to the input management director 34.3 comprises (1) the virtual key code for key currently selected on the keyboard 14.1 (the selected key), (2) the scan code associated with the selected key and received from the keyboard 14.1, (3) the Key_Down indication (in the form of a Key_Down flag) associated with the selected key, (4) the repetition indication (in the form of a ON/OFF flag), and (5) a repetition number indicating the amount of repetitions collected by the keyboard 14.1 before the input management system 20 was notified). If, at block 120, the keyboard input received is found to not be the first repeated instance of that keyboard input, then the input management system 20 filters out the keyboard input by not passing it on for further processing. Keyboard input is preferably filtered out in this way when the repeated instance of the keyboard input is not the first repeated instance so as to provide a consistent user input state while redirection of keyboard input to the second process 34 is taking place.

Referring to FIG. 14, registered messages received by the input management director 34.3 from the input management system 20 are treated as keyboard input and evaluated largely in the same way as described in the first embodiment with reference to FIG. 4. However, since the repetition indications associated with keyboard input are used in place of a redirection timer, the input management director 34.3 checks at block 141 for a repetition indication associated with the keyboard input currently received. If the keyboard input currently received by the input management director 34.3 is found to have the repetition indication at block 141, then processing proceeds to block 150 where the redirection flag in the input management system 20 is set to "ON" and the redirection cancellation key is recorded. If the keyboard input currently received by the input management director 34.3 is found to not have the repetition indication at block 141, then the keyboard input currently received is, in the form of a key message, passed on at block 146 to the predictive text entry system 34.1 for further processing. Note that since the input management system 20 preferably filters out repeated instances of the keyboard input other than the first repeated instance of the keyboard input, if the input management director 34.3 determines at block 141 that the keyboard input currently received has the repetition indication associated with it, the input management director 34.3 will know that keyboard input currently received is the first repeated instance in a row of that keyboard input.

Figure 15:
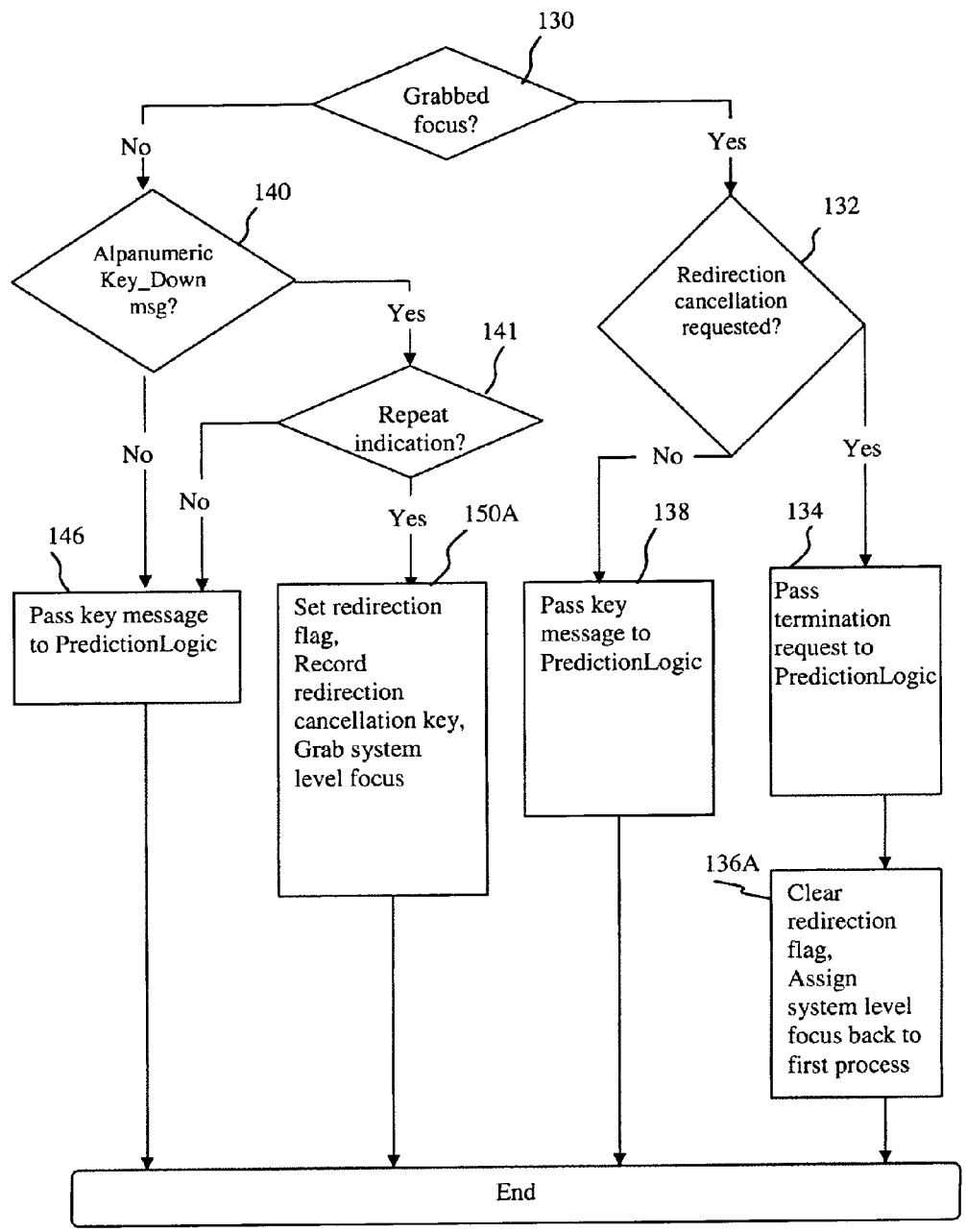
FIG. 15 is a flow diagram illustrating the operation of another variation of an input management director in accordance with another embodiment of the present invention.

In yet another variation, the further embodiment shown in FIGS. 13 and 14 can be implemented without using logical input focus to manage redirection of keyboard input. In this variation, the input management system 20 operates in the same manner as with the embodiment shown in FIG. 13. However, the input management director 34.3, as shown in FIG. 15, is configured to reassign, at block 150A, system-level input focus from the first process 30 to the predictive text entry system 34.1 (or more generally, to the second process 34) in response to detection at block 141 that the keyboard input currently received by the input management director 34.3 has a repetition indication. In this variation, the input management director 34.3 is also configured to assign system-level input focus back to the first process 30 in response to a redirection cancellation request being received. In FIG. 15, system-level input focus is assigned back to the first process 30 at block 136A. In this variation, when Windows™ is used, the system-level input focus is assigned and reassigned using the AttachThreadInput function, the SetActiveWindow function, the SetFocus function and the SetForegroundWindow function, provided by Windows™.

Figure 16:
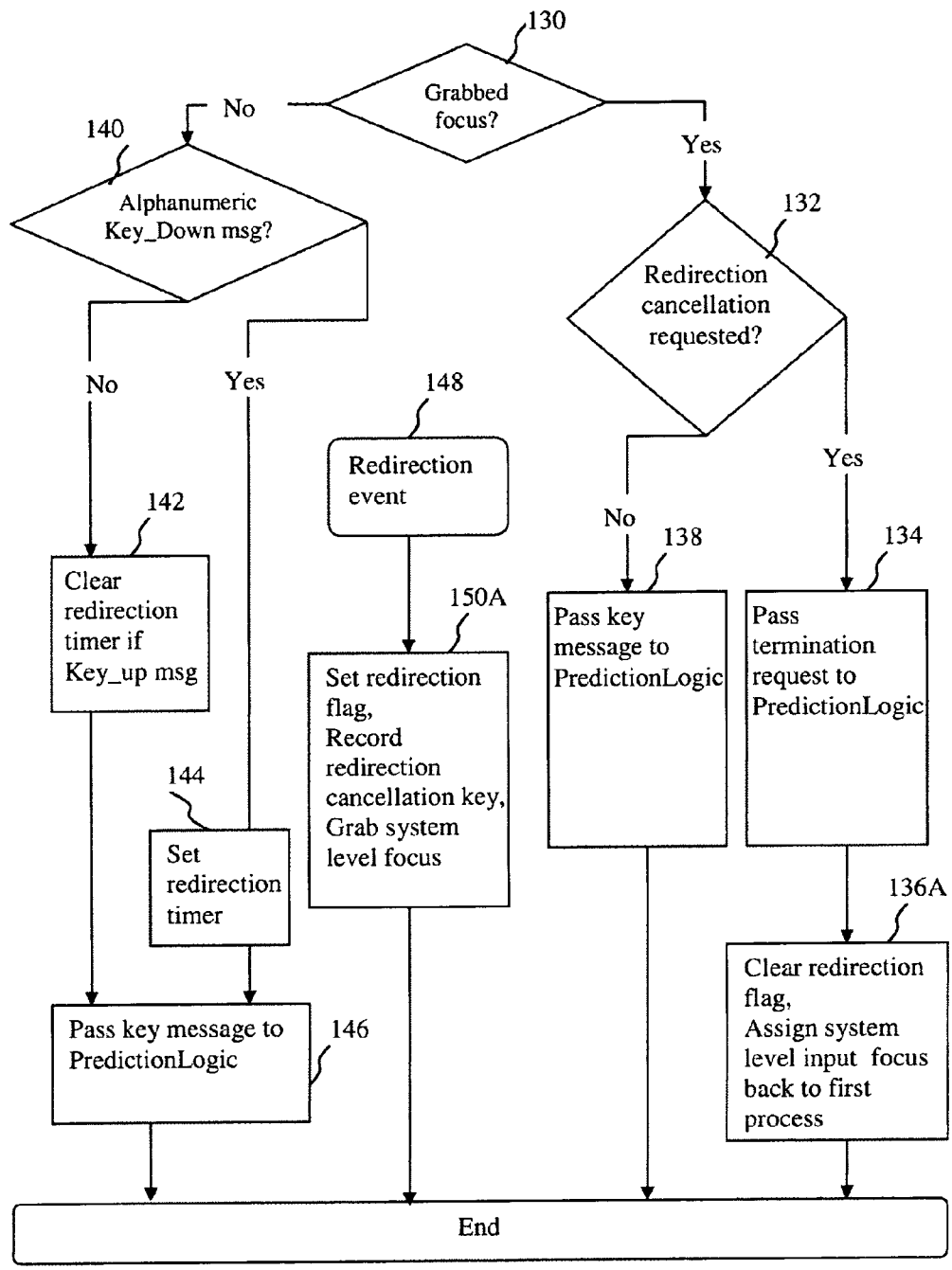
FIGS. 16 to 20 are diagrams illustrating yet further aspects and variations in accordance with the present invention.

Referring to FIG. 16, in a variation of the first embodiment (shown in FIGS. 1, 2, 3 and 4), logical input focus is not used to manage redirection of keyboard input. In this variation, the redirection timer is still used, as is the case in the first embodiment. In this variation, the input management system 20 continues to operate in the same manner as with the first embodiment (described earlier in connection with FIG. 3). However, the input management director 34.3, as shown in FIG. 16, is configured to reassign, at block 150A, system-level input focus from the first process 30 to the predictive text entry system 34.1 in response to detection of a redirection event at block 148. The input management director 34.3 is also configured to assign system-level input focus back to the first process 30 in response to a redirection cancellation request being received. In FIG. 16, system-level input focus is assigned back to the first process 30 at block 136A. In this variation, when Windows™ is used, the system-level input focus is assigned and reassigned using the AttachThreadInput function, the SetActiveWindow function, the SetFocus function and the SetForegroundWindow function, provided by Windows™.

Rapid Dictionary Updates Using Control-C

Figure 18:
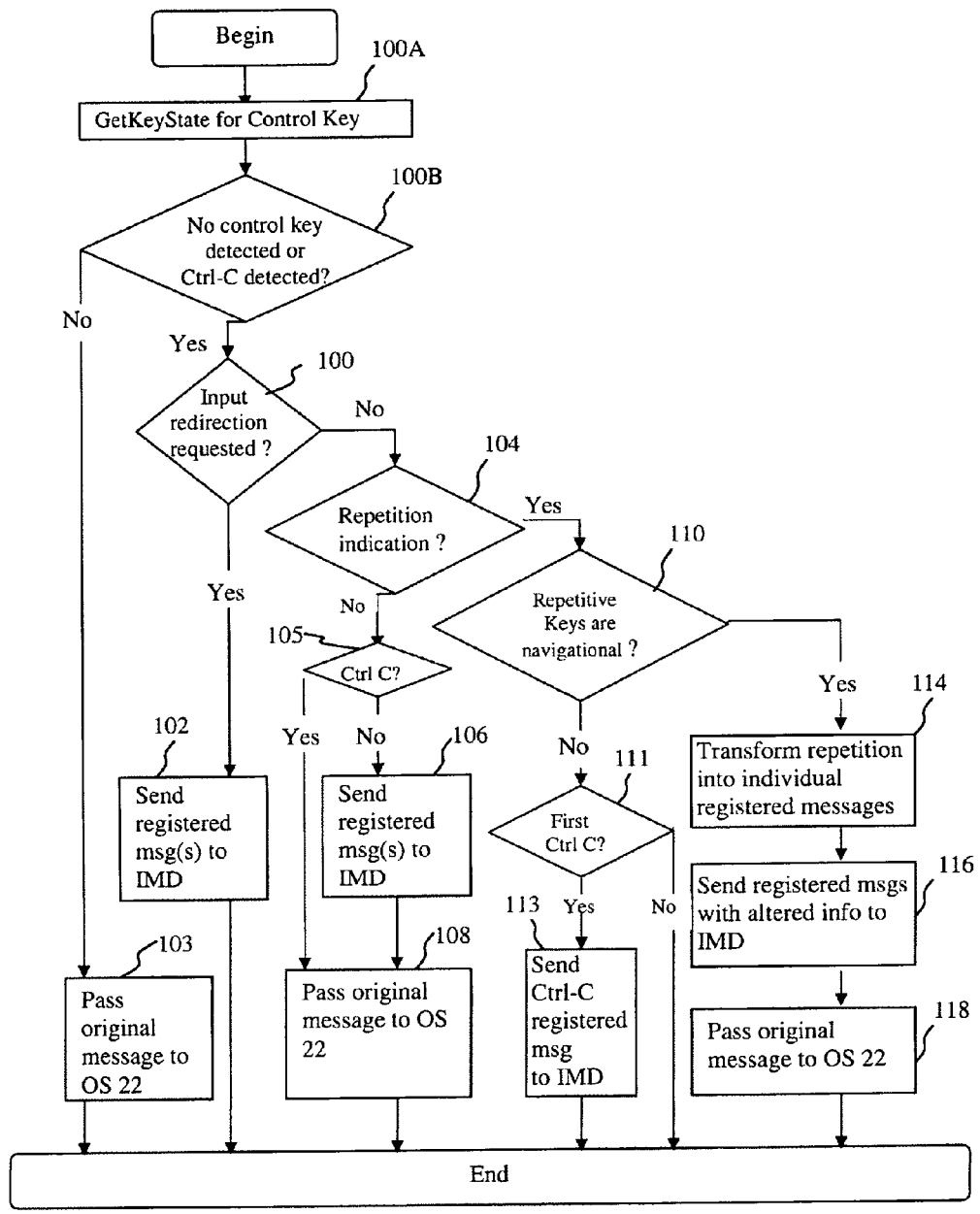
Figure 19:
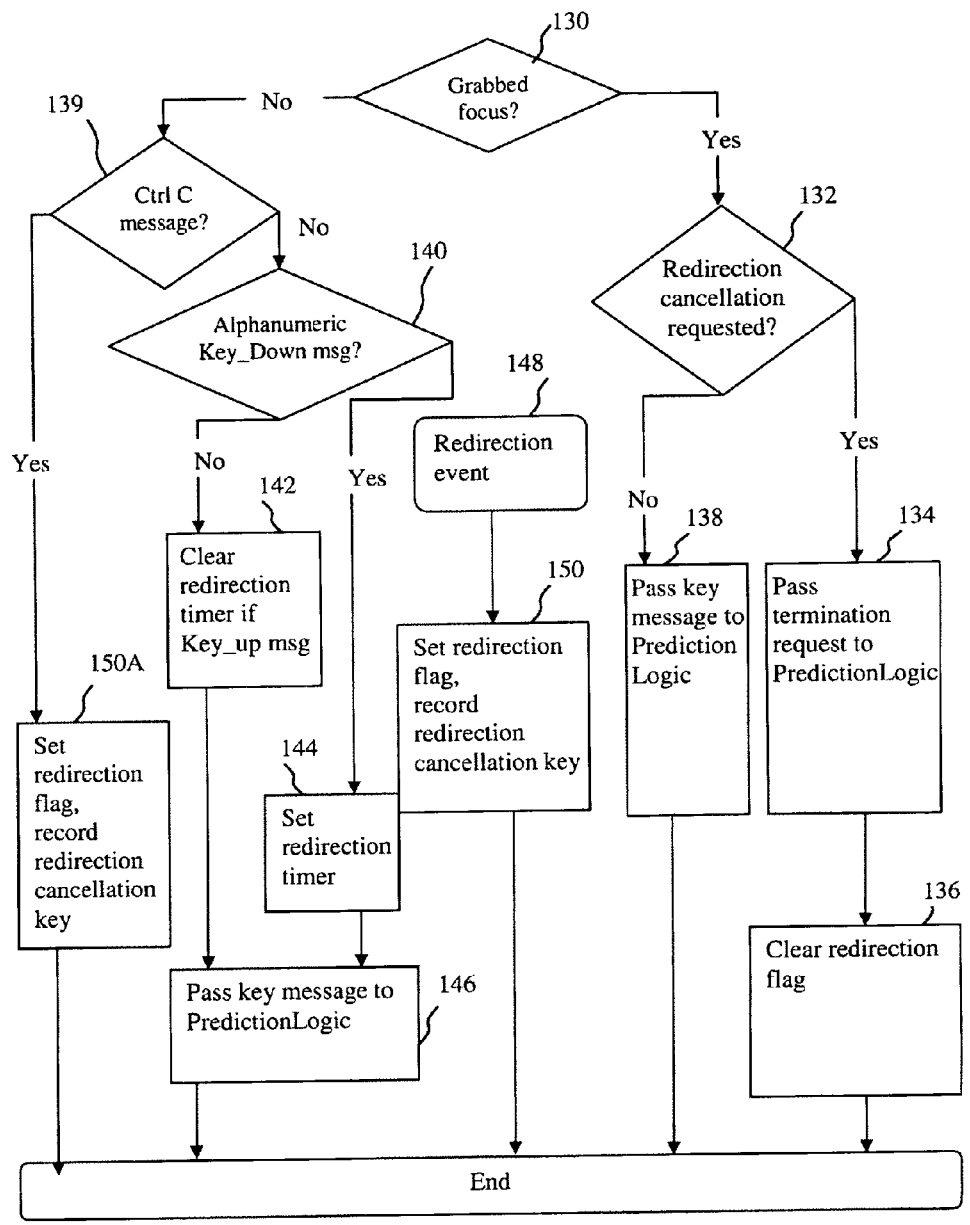

Referring to FIGS. 18 and 19, in another aspect, when the predictive text entry system 34.1 is used, such as in the first embodiment, a character sequence already displayed in an editor window of an applicable process (such as the word processor representing first process 30) can be made readily available for addition to a dictionary used by the predictive text entry system 34.1 by having the input management system 20 monitoring for a keyboard event indicating that control-C has been selected for predetermined time limit $T_1$.

As illustrated in FIG. 18, in this variation, the input management system 20 checks at block 100A the input state of the control key. In Windows™, this is done by invoking the GetKeyState function provided by Windows™ to determine whether the control key is currently selected. At block 100B, the input management system 20 checks to see whether no control key has been selected or whether the control-C key has been selected. If either the control key has not been selected or the control-C key in particular has been selected, processing proceeds to block 100 where the input management system 20 will check whether redirection has been request as with the first embodiment. Note that keyboard input received by the input management system 20 that is not selected in conjunction with the control key, such as ordinary alphanumeric characters and the like, will be passed on to block 100 and processed by the input management system 20 in the manner described above for the first embodiment. If the control-C input sequence is identified at block 100B, the input management system 20 the control-C input sequence will be processed via blocks 100, 104 and 110 (as applicable). On the other hand, if the control key is selected with a key other than "C", then any characters selected in conjunction with the control key will be passed on for use by the first process 30 via block 103.

If the control-C input sequence is detected at block 100B and a redirection request for keyboard input is detected at block 100, then the C entries in conjunction with the control key are passed on to the input management director 34.3 in the form of registered messages at block 102. The input management director 34.3 will, in this case, simply ignore the repeated C entries (after the first instance of C) received in conjunction with the control key.

If the control-C input sequence is detected at block 100B and but no redirection request for keyboard input is detected at block 100, then processing proceeds to block 104 where, if a redirection indication is detected in the manner described in the first embodiment, processing proceeds to block 105. If the control-C input sequence is identified at block 105, the input management system 20 passes the control-C input sequence on to the operating system 22 by calling the CallNextHookEx function. In this way, the first process 30 can act upon the control-C input sequence by placing a copy of the selected character sequence (if any) into the clipboard managed by Windows XP™ (or more generally, by the operating system 22). If the control-C input sequence is not identified at block 105, then the keyboard input is sent as a registered message to the input management director 34.3 in the ordinary manner described above for the first embodiment.

In this variation, if the control-C input sequence is selected long enough by the user, the keyboard 14.1 starts an automatic repeat feature, flagging keyboard input events with a repetition indication. When the first occurrence of the repetition of the control-C input sequence is identified by the input management system 20 at block 111, a registered message indicating a control-C event is sent at block 113 to the input management director 34.3. The input management director 34.3 will, at block 139, identify the registered message indicating a control C event, and in response will, at block 150A, set the redirection flag and record the redirection cancellation key (in this case the key associated with the letter "c") for the purposes of identifying when redirection should stop and keyboard input should be sent to the first process 30. Once this is carried out, the predictive text entry system 34.1 starts a dialog window displaying the content captured in the clipboard by the control-C input sequence and questions the user whether this content should be added to a dictionary used by the predictive text entry system 34.1.

Multilingual Display

Figure 20:
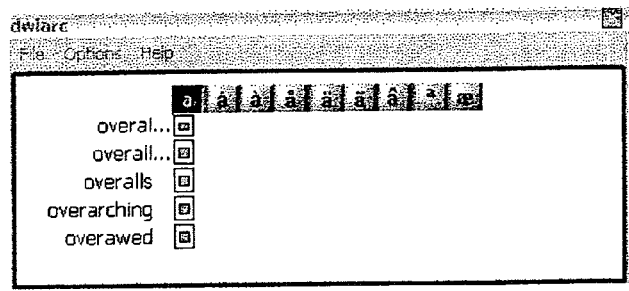

In another aspect, the predictive text entry system 34.1 (or more generally, the second process 34) is configured to display variations of a character selected by the user in response to a redirection event in which keyboard input is redirected to the predictive text entry system 34.1. In this case, when an alphanumeric key on the keyboard 14.1 is selected for predetermined time limit $T_1$, keyboard input is redirected from the first process 30 to input management director 34.3. The input management director 34.3 checks at block 130 (FIG. 4) that logical input focus has been redirected, in the same manner as described above for the first embodiment. In response to determining that logical input focus has been redirected to the predictive text entry system 34.1, the input management director 34.3 passes the keyboard input to the predictive text entry system 34.1 which identifies the keyboard input, and, if the keyboard input is associated with selection of an alphanumeric key, then the predictive text entry system 34.1 retrieves and displays a list of available variations of the alphanumeric key for user selection. The available variations of the alphanumeric key for user selection include preferably a set of variations representing a plurality of ways in which the alphanumeric key can be displayed, including variations of the alphanumeric key having accents used in certain languages. For illustration purposes, a selectable list of available variations of the alphanumeric character "a" is shown displayed in FIG. 20, in response to the letter "a" being selected for the predetermined time limit $T_1$. When a particular variation of the alphanumeric character "a" is selected, it will replace the corresponding alphanumeric character "a" in the text editor window of the first process 30.

Alternative Character Sets

In the first embodiment, the input management system 20 and the input management director 34.3 use alphanumeric characters that are selected for a predetermined period of time as the trigger for a redirection of keyboard input from the first process 30 to the second process 34. In another aspect of the present invention, the input management system 20 and the input management director 34.3 can be configured to use other character sets to serve as the trigger for a redirection of keyboard input. In this variation, redirection of keyboard input is triggered by the selection of a character from another character set for the predetermined period of time. In this variation, the input management system 20 and the input management director 34.3 can be configured to support any set of characters which the user may then select and use to enter text into the personal computing device 10. The terms "character set" and "set of characters" refer to a set containing a plurality of letters, numbers and/or other typographic symbols. Examples of character sets include, but are not limited to, one or more alphabets of a written language (for example, English, French, German, Spanish, Italian, Chinese, or Japanese), and binary-coded character sets such as ASCII (American Standard Code for Information Interchange), EBCDIC (Extended Binary Coded Decimal Interexchange Code), BCD (Binary Coded Decimal), and Unicode.

Pointer-Type Events

In another variation of the first embodiment, when a virtual keyboard is used in place of the physical keyboard 14.1, selection and deselection of keys on the virtual keyboard are preferably communicated directly to the predictive text entry system 34.1. Pointer-type devices such as a stylus and a mouse are used to generate pointer-type input events. In general, pointer-type input events comprise information identifying the state of the pointer-type device, for example, the "up" state or no contact state, and the "down" state or contact state. In addition, selection and deselection of a completion candidate display in a graphical user interface, through the use of a pointer-type device, will also preferably result in communication of the pointer-type input events directly to the predictive text entry system 34.1.

In response to receiving a pointer-type input event, the predictive text entry system 34.1 in this variation is configured to verify whether the pointer-type input event is associated with a recognizable region of the touch sensitive screen. If the pointer-type input event is not associated with the recognizable region of the touch sensitive screen, the predictive text entry system 34.1 simply ignores the event. If the pointer-type input event is associated with the recognizable region of the touch sensitive screen, the predictive text entry system 34.1 translates the pointer-type input event into a translated event representing (a) an equivalent input key event if the pointer-type input event is associated with selection or deselection of a key on the virtual keyboard, or (b) an unrecognized input key event if the pointer-type input event is associated with selection or deselection of a completion candidate displayed in the graphical user interface. Equivalent input key events are passed on to the input management director 34.3 for processing, which processes such equivalent input key events following the logic described in the first embodiment above with reference to FIG. 4. After an equivalent input key event is processed by the input management director 34.3, it is passed back to the predictive text entry system 34.3, which determines whether the output related to this input key event needs to be sent to the process with system-level input focus in the form of character messages. Note here that the predictive text entry system 34.1 continues to use on the focus recorder, as in the first embodiment, to decide where the input associated with the selected completion candidate or virtual key (as the case may be) should be sent.

In the variation immediately above, continued selection of a virtual key on the virtual keyboard using a pointer-type device (such as a stylus or mouse) preferably results in the redirection process being triggered as described in the first embodiment with reference to FIG. 4. Here a pointer-type input event identifying an "up" state for the associated pointer-type device will initiate the process of redirection cancellation described in the first embodiment with reference to FIG. 4.

In another alternative variation, the virtual keyboard can operate as a separate entity from the predictive text entry system 34.1. With this arrangement, where the virtual keyboard produces input key events as a result of key selection and deselection, similar to a physical keyboard, the input management system 20 (as in the first embodiment) preferably monitors for selections and deselections of keys from the virtual keyboard. An example of such a virtual keyboard is the On-Screen keyboard provided by Windows XP™.

Enhanced Keyboard-Type Device

Figure 21:
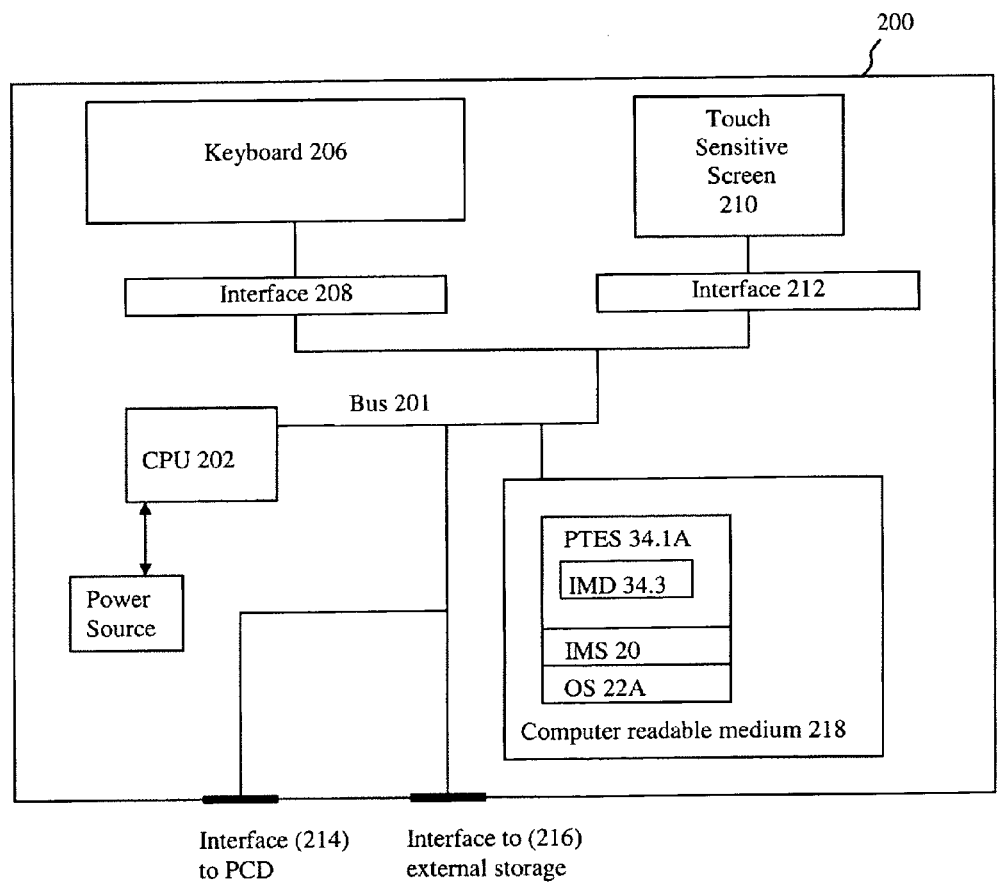
FIGS. 21 to 25 are diagrams illustrating further aspects and variations associated with an enhanced keyboard-type device, in accordance with the present invention.
Figure 22:
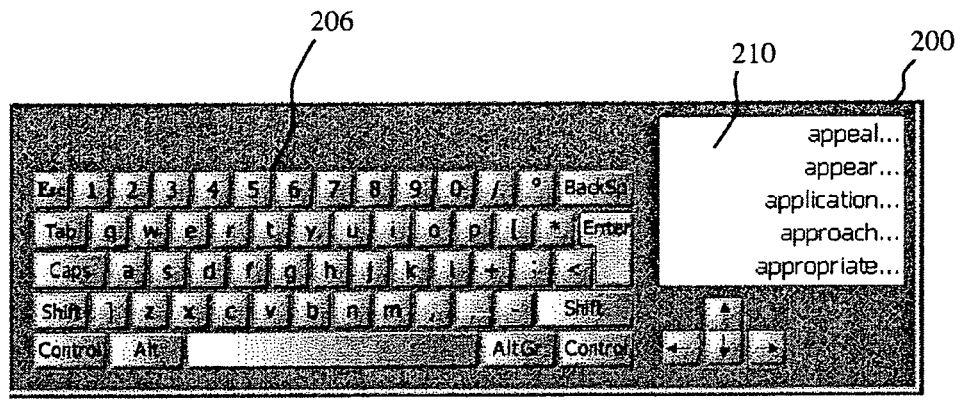

Referring to FIGS. 21 and 22, in yet another aspect, there is provided an enhanced keyboard-type device 200. In this aspect, the enhanced keyboard-type device comprises:

(a) a plurality of user input signal generators for producing first input signals in response to user actuation thereof;
(b) a display device; and
(c) a processor circuit in communication with the display device and the user input signal generators.

In the embodiment illustrated in FIGS. 21 and 22, the plurality of user input signal generators comprises a plurality of keys, and more particularly, a plurality of physical keys represented by keyboard 206, which operates as an ordinary keyboard. In this embodiment, the display device comprises a touch-screen display which is represented by touch sensitive screen 210. The processor circuit is illustrated in FIG. 21 and comprises, in the embodiment shown, a processing unit 202 (for example, a CPU) connected via bus 201 to a computer readable medium 218. The computer-readable medium 218 provides a memory store for computer programs and data located in the enhanced keyboard-type device 200, including, in this embodiment, input management system 20, operating system 22A, and second process 34 (represented by the predictive text entry system 34.1A). The computer-readable medium 218 can include one or more types of computer-readable media including volatile memory such as Random Access Memory (RAM), and non-volatile memory, such as a hard disk or Read Only Memory (ROM). In the embodiment shown, the computer-readable medium 218 comprises RAM, ROM and flash memory.

Like the predictive text entry system 34.1 in the first embodiment, the predictive text entry system 34.1A is an application configured to predict and retrieve predictive text completion candidates (or completion candidates) from a dictionary by determining which predictive text completion candidates in the dictionary are more likely to be the ones that the user is attempting to type based on the characters in the partial text entry generated by the user. In the embodiment shown in FIGS. 21 and 22, the predictive text entry system 34.1A is configured to operate on the enhanced keyboard-type device 200. Note that other types of user programs, such as a calculator or thesaurus, can also be stored in the enhanced keyboard-type device 200 and used in connection with the input management system 20.

The processor circuit shown in FIG. 21 is configured to:
(i) generate a plurality of predictive text completion candidates in response to the first input signals produced by the user input signal generators in response to user actuation thereof and to display the plurality of predictive text completion candidates on the display device; and
(ii) communicate (via interface 214) at least one of the predictive text completion candidates to a personal computing device remote from the enhanced keyboard-type device 200 in response to user selection of the at least one of the predictive text completion candidates.

Thus, the enhanced keyboard-type device 200 provides both a mechanism for providing keyboard-type input (input signals) generated through user actuation of the keyboard 206 to the remote personal computing device and a mechanism for processing the keyboard-type input using the processor circuit so that predictive text completion candidates can be displayed on the touch sensitive screen 210 and are available for user selection and transmission to the remote personal computing device for processing by a remote computer program running on the remote personal computing device. Preferably, such processing includes inserting the user selected predictive text completion candidate in a text editor window provided by the remote computer program and displayed on a remote display device associated with the remote personal computing device.

Figure 24:
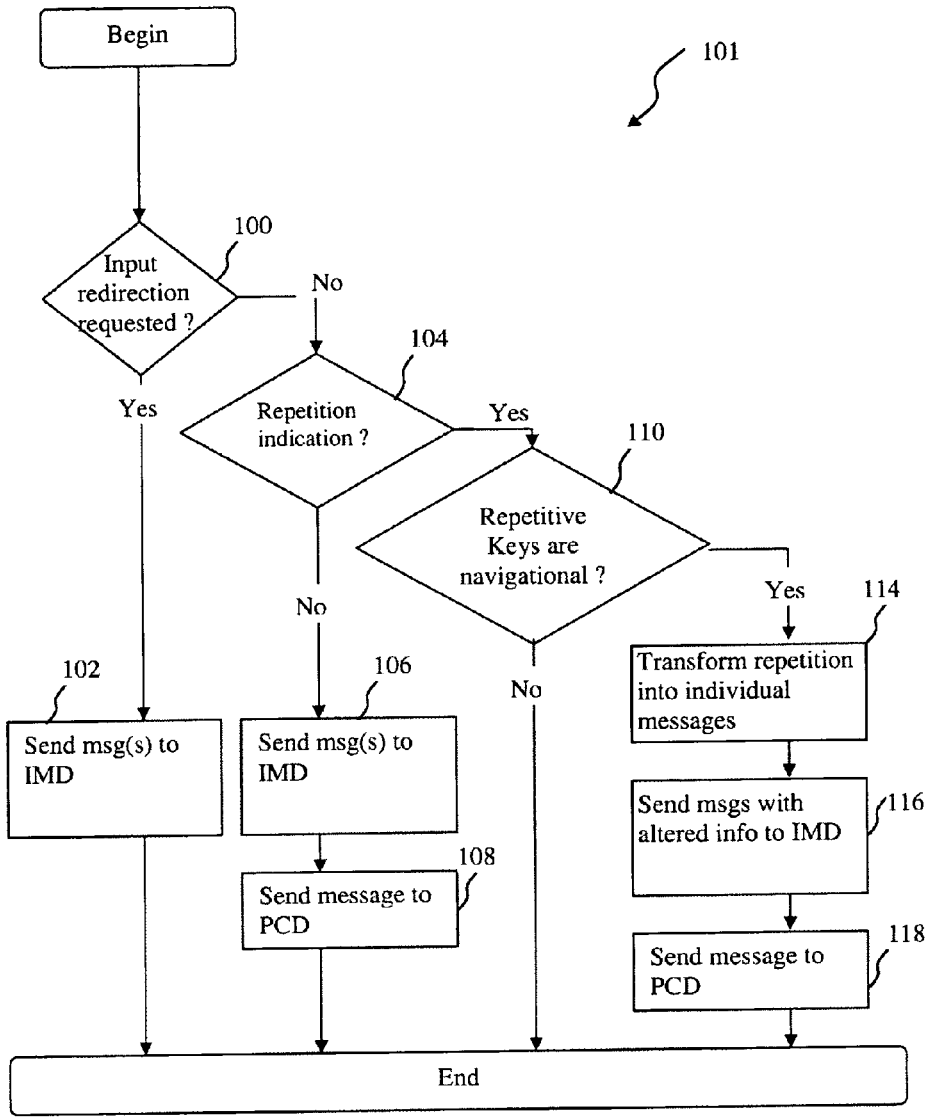
Figure 25:
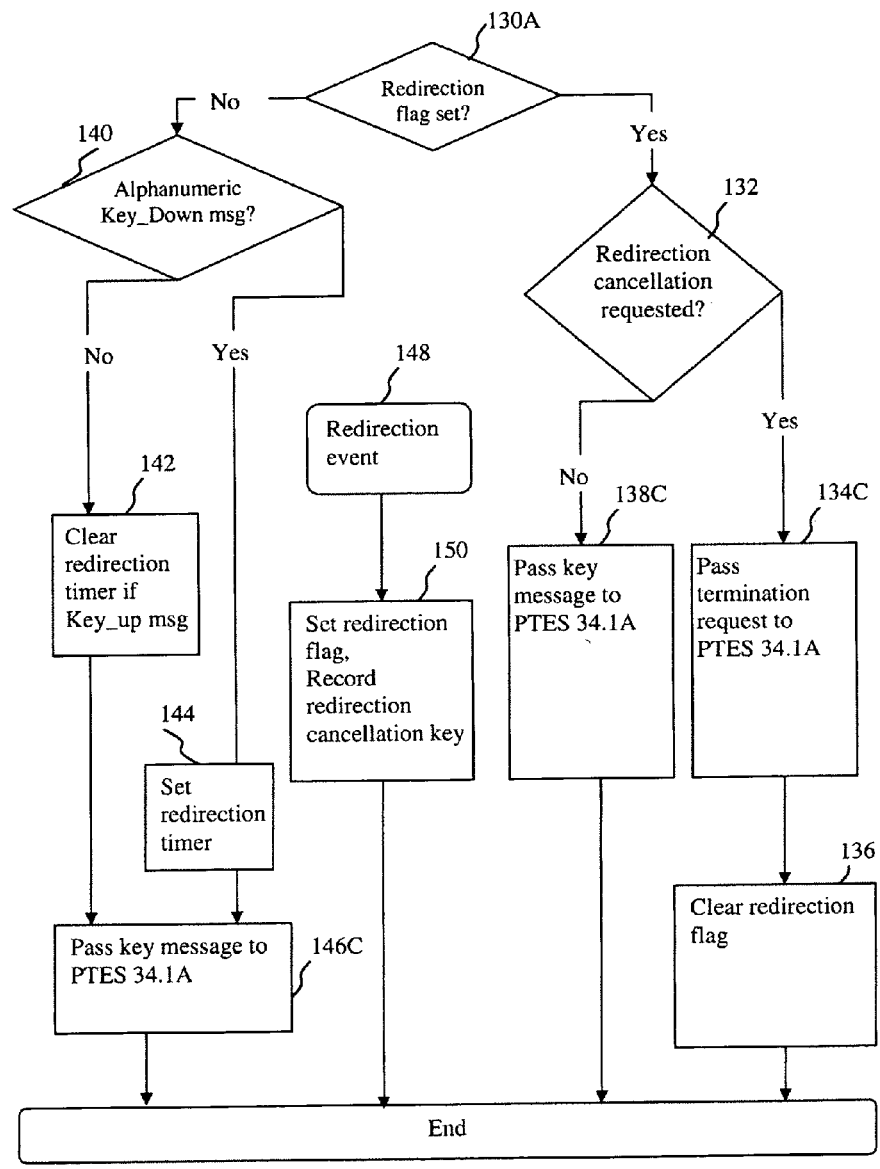

The user can provide user input to the remote personal computing device using either the keyboard 206 or the touch sensitive screen 210. The keyboard 206 operates in a similar way as the keyboard 14.1 in the first embodiment. Each selection of a key and each deselection of a key on the keyboard 206 will result in a scan code being sent by the enhanced keyboard-type device 200 to the remote personal computing device. However selections and deselections of keys on the keyboard 206 will also be received as input key events by the input management system 20 operating within the keyboard-type device 200. In response to receiving such input key events, the input management system 20 is configured to process the input key events according to the flow diagram shown in FIG. 24. The logical flow of the operation of the input management system 20 and the input management director 34.3 for the enhanced keyboard-type device 200 is shown in FIGS. 24 and 25.

In this embodiment, the predictive text entry system 34.1A, which is running on the enhanced keyboard-type device 200, is configured to display on a display area on the touch sensitive screen 210 a plurality of predictive text completion candidates for user selection, wherein the plurality of predictive text completion candidates are generated by the predictive text entry system 34.1A based on the contents of an input string generated from the input key events received by the predictive text entry system 34.1A from the keyboard 206.

The enhanced keyboard-type device 200 is also configured to direct the input key events being sent to the remote personal computing device instead to the input management system 20 in response to identifying (detecting) a first predefined input key event for at least a predetermined time period $T_1$. In the present embodiment, the first predefined input key event is the selection of an alphanumeric key on the keyboard 206 for a predetermined time period $T_1$. The detection of a first predefined input key event for at least a predetermined time period $T_1$ represents a redirection event. In the embodiment shown, a redirection timer is used to determine if the first predefined input key event is detected for predetermined time period $T_1$. In response to detection of the redirection event, the input management system 20 is configured to set a redirection flag to "ON" (see blocks 148 and 150) and to direct all user input (in the form of input key events) to the input management director 34.3 located within the enhanced keyboard-type device 200 (in the illustrative embodiment, embedded within the predictive text entry system 34.1A) effectively stopping the flow of keystrokes to the remote personal computing device from the keyboard 206 for so long as the redirection event is not terminated (canceled). During the redirection event, the input management director 34.3 is configured to pass the input key events (in the form of keyboard messages) on to the predictive text entry system 34.1A at block 138C. The predictive text entry system 34.1A in turn is configured to update the list of available predictive text completion candidates for display in the touch sensitive screen 210 based on the input key events received from the input management director 34.3.

When the user selects a predictive text completion candidate displayed on the touch sensitive screen 210 a "mouse down" event (more generally, a "point device down" event) will be received by the predictive text entry system 34.1A. Continuing selection of the selected predictive text completion candidate will trigger the redirection event once the redirection timer (set at block 144 of FIG. 25) reaches the predetermined time period $T_1$.

The predictive text entry system 34.1A is configured to treat reception of a "mouse up" event as detection of a redirection cancellation event. In the present embodiment, the "mouse up" event indicates the occurrence of the redirection cancellation event and is identified at block 132 of FIG. 25 as a redirection cancellation required. If the redirection cancellation event is detected (in the form of a redirection cancellation request), the input management director 34.3 is configured to pass at block 134C a termination request (representing an indication of the redirection cancellation event) to the predictive text entry system 34.1A so that the predictive text entry system 34.1A can finalize its selection (if any) of a predictive text completion candidate from the list of predictive text completion candidates displayed in the touch sensitive screen 210. In this case, if a predictive text completion candidate is selected when a redirection cancellation event occurs, it will be transmitted by the enhanced keyboard-type device 200 to the remote personal computing device for use by a remote program operating on the remote personal computing device. Transmission of the selected predictive text completion candidate (where one is selected) comprises sending a sequence of associated scan codes for each character of the selected predictive text completion candidate to the remote personal computing device where the sequence of scan codes represent the selection and deselection of keys for the selected predictive text completion candidate in the same way that such scan codes would represent the selection and deselection of keys for the sequence of characters making up the selected predictive text completion candidate had the sequence of characters been typed by the user using simply the keyboard 206.

In response to detecting a redirection cancellation event at block 132 (of FIG. 25), the input management director 34.3 is also configured to instruct the input management system 20 to direct further input key events received from the keyboard 206 to the remote personal computing device. In the embodiment shown in FIGS. 21, 22, 24 and 25, this is performed by clearing the redirection flag at block 136.

The particular embodiment illustrated with FIGS. 24 and 25 operates largely in the manner described above for the first embodiment (with reference to FIGS. 3 and 4). However, in the embodiment illustrated with FIGS. 24 and 25, the user input management system 20 is configured to send a scan code to the remote personal computing device at blocks 102, 108 and 118. As well, in the embodiment shown with FIGS. 24 and 25 system-level input focus is not recorded and therefore there is no need to use a focus recorder such as is used in the first embodiment. Instead the input management director 34.3 is configured in FIG. 25 to check whether the redirection flag is set at block 130A. In addition, the input management director 34.3 is configured at blocks 138C and 146C to pass input key event currently received (ie. keyboard input current received) from the input management system 20 to the predictive text entry system 34.1A in the form of a key message.

Preferably, events generated through operation of the touch sensitive screen 210 (e.g. mouse down and mouse up events) are immediately received by the predictive text entry system 34.1A, bypassing the input management system 20 and the input management director 34.3. In this case, when a mouse up event is received by the predictive text entry system 34.1A while the redirection flag is set to "ON", the predictive text entry system 34.1A is configured to notify the input management director 34.3 that a redirection cancellation event has occurred, in which case processing proceeds according to blocks 132, 134C and 136.

On start-up of the enhanced keyboard-type device 200, the user selects the user-preferred keyboard layout available on the portable keyboard, which should be known and selected on the remote personal computing device. In this manner both the remote personal computing device as well as the enhanced keyboard-type device 200 are in synch insofar as the scan codes being used, when these scan codes are sent from the enhanced keyboard-type device 200 to the remote personal computing device following user input. The arrangement of the keys for this keyboard layout can vary according to the user's preference.

The communication between the enhanced keyboard-type device 200 and the remote personal computing device occurs in the form of scan codes. The enhanced keyboard-type device 200 generates two scan codes when the user types a key, one when the user presses the key and another when the user releases the key. This technique is well known art in the industry.

In the above embodiment, the enhanced keyboard-type device 200 is configured to send the scan codes representing a selected predictive text completion candidate to the remote personal computing device at a rate that the remote personal computing device is able to handle.

It will be noted that the above embodiment (shown in FIGS. 21, 22, 24 and 25) separates a portion of the input processing and associated data from the remote personal computing device that the keyboard-type input and associated data (e.g. completion candidates, if selected) will be used upon. In one aspect, this provides an operating system-independent way of storing and using a prediction system. In another aspect, this provides an improved set of functionality on the enhanced keyboard-type device 200, allowing for a more intelligent keyboard. In another aspect, the enhanced keyboard-type device 200 is also portable and adaptive to different types of remote personal computing devices.

In an alternative arrangement, a plurality of operating system-specific configurations of the predictive text entry system 34.1 and at least one instance of the data associated with predictive text entry system 34.1 can be stored on an external computer-readable medium (such as a removable USB drive) configured to communicate with the enhanced keyboard-type device 200. In this arrangement, the operating system running on the enhanced keyboard-type device 200 is one of the operating systems for which there is an operating system-specific configuration of the predictive text entry system 34.1 stored on the external computer-readable medium. The enhanced keyboard-type device 200 in this case is configured to operate the operating system-specific configuration of the predictive text entry system 34.1 from the external computer-readable medium if it is available and to use the associated data (e.g. a dictionary comprising predictive text completion candidates) located on the external computer-readable medium.

In this alternative arrangement, the external computer-readable medium is adapted to be disconnected (decouplable) from the enhanced keyboard-type device 200 and to be connected (couplable) directly to the remote personal computing device for operation and use of the predictive text entry system 34.1 directly on the remote personal computing device. Preferably, the external computer-readable medium is adapted to be connected to a second physical instance of the enhanced keyboard-type device 200 for use and operation of that second physical instance in connection with one or more remote personal computing devices. In this arrangement, the data associated with the predictive text entry system 34.1 can also be stored on the external computer-readable medium. Moreover, as one or more of the operating system-specific configurations of the predictive text entry system 34.1 located on the external computer-readable medium are used, the associated data (such as the dictionary) is preferably updated whenever the predictive text entry system 34.1 is instructed to update its dictionary. In this way, a very portable input system is available to the user, containing personal data associated with one or more of the operating system-specific configurations of the predictive text entry system 34.1 so that the user-specific configuration of the one or more of the operating system-specific configurations of the predictive text entry system 34.1 can be used on any type of personal computing device compatible with the external computer-readable medium.

Figure 23:
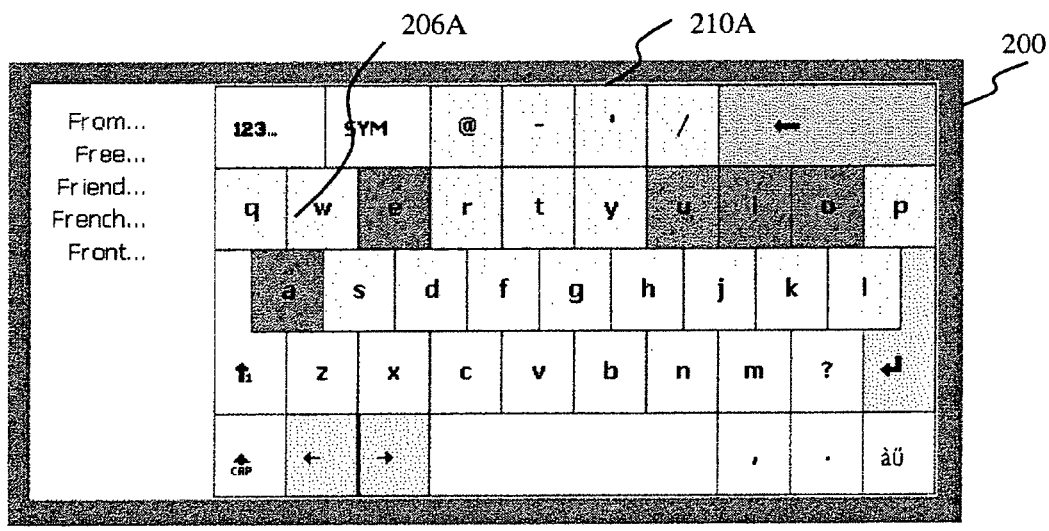

In another variation of the embodiment shown in FIGS. 21, 22, 24 and 25, as illustrated in FIG. 23, the display device of the enhanced keyboard-type device 200 comprises a touch-screen display, and the plurality of user input signal generators comprises a plurality of virtual keys which comprise a plurality of respective portions of a touch-sensitive surface of the touch-screen display. In the arrangement shown in FIG. 23, the keyboard 206A is a virtual keyboard displayed on touch-sensitive screen 210A.

In yet another variation of the embodiment shown in FIGS. 21, 22, 24 and 25, the enhanced keyboard-type device 200 is configured to receive display information from the remote personal computing device and to display such display information on a touch-sensitive portion of the display device of the enhanced keyboard-type device 200. This can be advantageous when a mouse cursor needs to be positioned on a screen.

Although this invention has been described with reference to illustrative and preferred embodiments of carrying out the invention, this description is not to be construed in a limiting sense. Various modifications of form, arrangement of parts, steps, details and order of operations of the embodiments illustrated, as well as other embodiments of the invention, will be apparent to persons skilled in the art upon reference to this description. It is therefore contemplated that the appended claims will cover such modifications and embodiments as fall within the true scope of the invention.

What is claimed is:

1. A computer-implemented method of processing a stream of input key events associated with user input received from a keyboard-type device, the keyboard-type device selected from at least one of a keyboard and a keypad, the method comprising:
   (a) receiving input key events associated with a first process active within an operating system;
   (b) monitoring the input key events for a first predefined input key event associated with user selection of a first key of the keyboard-type device for at least a predetermined time period;
   (c) in response to identifying the first predefined input key event, redirecting the input key events from the first process to a second process wherein redirecting the input key events to the second process comprises providing representations of further keyboard events to the second process, but not to the first process, for processing;
   (d) monitoring the input key events for a second predefined input key event associated with further redirection of the input key events; and
   (e) in response to identifying the second predefined input key event, redirecting the input key events from the second process to another process.

2. The method of claim 1, wherein the another process is the first process.

3. The method of claim 2 further comprising
   generating a plurality of predictive text completion candidates in response to the input key events which are received by the second process; and providing at least one of the plurality of predictive text completion candidates to the first process in response to the second predefined input key event.

4. The method of claim 1, wherein the second predefined input key event is identified in association with user deselection of the first key.

5. The method of claim 1, wherein the second predefined input key event is identified in association with user selection of a second key.

6. The method of claim 1, wherein the first predefined input key event is identified by detecting a selection signal for at least the predetermined time period, the selection signal indicating user selection of the first key.

7. The method of claim 1, wherein the first predefined input key event is identified by receiving an indication that the first key was selected for at least the predetermined time period.

8. The method of claim 1, wherein the first predefined input key event is identified by detecting generation of one or more auto-repeated characters by auto-repeat functionality associated with the first key.

9. The method of claim 8, wherein detecting generation of one or more auto-repeated characters comprises detecting receipt of at least one message associated with the first key and having a repetition indication.

10. The method of claim 1, wherein the first key represents an alpha-numeric character.

11. The method of claim 1, wherein the keyboard is displayed as a virtual keyboard represented in a graphical user interface (GUI).

12. The method of claim 1, further comprising providing a copy of the input key events to the second process for monitoring by the second process.

13. The method of claim 1, further comprising processing the input key events in the second process while the input key events are redirected to the second process.

14. The method of claim 1, wherein redirecting the input key events to the second process is contingent upon the first predefined input key event meeting a process switching criterion, wherein different process switching criteria are associated with different processes being executed as the first process.

15. A non-transitory computer-readable storage medium having stored instructions for use in execution of the method of claim 1.

16. The method of claim 1 wherein the operating system continues to associate the further keyboard events with the first process by continuing to assign input received from the keyboard-type device to the first process.

17. The method of claim 1 further comprising
activating a redirection timer in response to user selection of the first key on the keyboard-type device; and
deactivating the redirection timer in response to user deselection of the first key on the keyboard-type device;
wherein the first predefined input key event is identified if the first key is selected for a period of time sufficient to allow the redirection timer to reach the predetermined time period.

18. The method of claim 1 wherein the second process has additional functionality to enhance the use of the first process.

19. The method of claim 1 wherein
the first process comprises at least one of a word processor, a browser, a micro-browser, a spreadsheet, a database interface, and an email application; and
the second process comprises a predictive text entry application.

20. The method of claim 1 wherein the first process operates within a computing device remote from the keyboard-type device and wherein the second process operates within the keyboard-type device.

21. The method of claim 20 wherein receiving input key events associated with the first process prior to identifying the first predefined input key event comprises transmitting representations of the input key events to the first process operating on the computing device remote from the keyboard-type device.

22. A non-transitory computer-readable storage medium having instructions for directing a processing unit to execute the method of claim 1.

23. A system for processing a user input stream received from a keyboard-type device, the system comprising:
(a) a processor;
(b) a non-transitory computer-readable storage medium storing instructions for directing the processor to execute the method of claim 1.

24. The method of claim 1 wherein the input key events define a stream of input key event data and wherein
(a) redirecting the input key events from the first process to the second process comprises redirecting the stream of input key event data from the first process to the second process; and
(b) redirecting the input key events from the second process to another process comprises redirecting the stream of input key event data from the second process to the another process.

25. A system for processing input key events associated with user input received from a keyboard-type device, the keyboard-type device selected from at least one of a keyboard and a keypad, the system comprising:
(a) means for receiving input key events associated with a first process active within an operating system;
(b) means for monitoring the input key events for a first predefined input key event associated with user selection of a first key of the keyboard-type device for at least a predetermined time period;
(c) means for redirecting the input key events from the first process to a second process in response to identifying the first predefined input key event wherein said means for redirecting the input key events from the first process to the second process comprises means for providing representations of further keyboard events to the second process, but not to the first process, for processing;
(d) means for monitoring the input key events for a second predefined input key event associated with further redirection of the input key events; and
(e) means for redirecting the input key events to another process in response to identifying the second predefined input key event.

26. A keyboard-type device comprising:
(a) a plurality of user input signal generators for producing first input signals in response to user actuation thereof;
(b) a display device; and
(c) a processor circuit in communication with said display device and said user input signal generators, said processor circuit configured to:
(i) monitor input key events represented by said first input signals for a first predefined input key event, and direct a flow of representations of the input key events to a personal computing device remote from the keyboard-type device;
(ii) if the first predefined input key event is identified in the input key events, stop the flow of representations of the input key events to the personal computing device, generate a plurality of predictive text completion candidates in response to said first input signals and display said plurality of predictive text completion candidates on said display device; and (iii) communicate at least one of said predictive text completion candidates to the personal computing device remote from the keyboard-type device in response to user selection of the at least one of said predictive text completion candidates.

27. The keyboard-type device of claim 26, wherein the plurality of user input signal generators comprises a plurality of keys.

28. The keyboard-type device of claim 27, wherein the plurality of keys comprises a plurality of physical keys.

29. The keyboard-type device of claim 27, wherein the plurality of keys comprises a plurality of virtual keys.

30. The keyboard-type device of claim 29, wherein the display device comprises a touch-screen display, and wherein the plurality of virtual keys comprises a plurality of respective portions of a touch-sensitive surface of said touch-screen display.

31. The keyboard-type device of claim 26, wherein the processor circuit is configured to receive display information from the remote personal computing device and to display such display information on a touch-sensitive portion of the display device.

32. A computer-implemented method of processing input key events associated with user input received from a keyboard-type device, the keyboard-type device selected from at least one of a keyboard and a keypad, the method comprising:
(a) receiving a stream of input key events associated with a first application active within an operating system;
(b) monitoring the stream of input key events for a first predefined input key event associated with a first user redirection request to redirect the stream of input key events from the first application to a second application, wherein the first predefined input key event is associated with user selection of a first key of the keyboard-type device for at least a predetermined time period;
(c) in response to identifying the first predefined input key event in the stream of input key events, causing at least some input key events received following the first predefined input key event to be directed to the second application and not to the first application;
(d) monitoring the stream of input key events for a second predefined input key event associated with a second user redirection request to redirect the stream of input key events from the second application to another application; and
(e) in response to identifying the second predefined input key event in the stream of input key events, causing at least some input key events received following the second predefined input key event to be directed to another application.

33. The method of claim 32 wherein monitoring the stream of input key events for a first predefined input key event comprises evaluating input key events associated with user selection of keys of the keyboard-type device, and further comprises, for each particular key selected by the user:
(i) if the user selection of the particular key of the keyboard-type device occurs for less than a predetermined time period, allowing input key events associated with the user selection of the particular key to be directed to the first application; and
(ii) if the user selection of the particular key of the keyboard-type device occurs for at least the predetermined time period, identifying that the first user redirection request has been made and directing at least some subsequent input key events to the second application and not to the first application.

34. The method of claim 33 wherein the another application is the first application and wherein the second user redirection request comprises a user redirection termination request to terminate the redirection of the stream of input key events from the first application to the second application.

35. The method of claim 32 wherein the another application comprises a predictive text entry application operable to generate a plurality of completion candidates for completing a partial text entry received from the user.

36. The method of claim 35 wherein the first application comprises at least one of a word processor, a browser, a micro-browser, a spreadsheet, a database interface, and an email application.

37. The method of claim 35, wherein causing input key events received following the second predefined input key event to be directed to another application, further comprises:
directing a set of input key events to the first application while providing a copy of the set of input key events to the predictive text entry application to enable the predictive text entry application to retrieve, from a dictionary, completion candidates based on the set of input events.

38. The method of claim 35, further comprising sending at least one completion candidate produced by the predictive text entry application to the first application.

39. The method of claim 32, further comprising:
causing a third application to become active within the operating system in response to user input from the keyboard-type device;
receiving at least one user redirection request via the keyboard-type device to direct at least one future input key event to the third application; and
directing the at least one future input key event to the third application.

40. The method of claim 32, wherein the first user redirection request represents an instruction from the user, received via the keyboard-type device, to temporarily invoke functionality provided by the second application to facilitate expanded functionality of the first application.

41. The method of claim 40, further comprising:
receiving at least one input key event associated with a first user redirection cancellation request whereby the user indicates that the functionality of the second application should be made temporarily unavailable to the user; and
causing further input key events to be directed to the first application.

42. The method of claim 32, wherein the second application is independent of the first application.

43. The method of claim 42, wherein the second application is operable to be configured independently of the first application without having to modify the programming code of the first application.

44. The method of claim 32, wherein identifying the first predefined input key event comprises detecting that the first key has been selected for a sufficient period of time to cause a redirection timer to reach the predetermined time period.

45. The method of claim 32, wherein identifying the first predefined input key event comprises detecting a repetition indication associated with the first key.

46. The method of claim 32, wherein identifying the second predefined input key event comprises detecting user deselection of the first key.

47. The method of claim 32, further comprising directing a set of input key events to the first application without providing a copy of the set of input key events to the second application.

48. A computer-implemented method of processing input key events associated with user input received from a keyboard-type device, the method comprising:
(a) receiving a stream of input key events associated with a first application active within an operating system;
(b) monitoring the stream of input key events for a first predefined input key event;
(c) in response to identifying the first predefined input key event in the stream of input key events, causing at least some input key events received following the first predefined input key event to be directed to a second application and not to the first application;
(d) monitoring the stream of input key events for a second predefined input key event; and
(e) in response to identifying the second predefined input key event in the stream of input key events, causing at least some input key events received following the second predefined input key event to be directed to another application.

49. The computer-implemented method of claim 48 wherein:
(a) the first application comprises at least one of a word processor, a browser, a micro-browser, a spreadsheet, a database interface, and an email application;
(b) the second application comprises a predictive text entry application operable to generate a plurality of completion candidates for completing a partial text entry generated in response to the user input; and
(c) the another application is the first application.

50. A non-transitory computer-readable storage medium having instructions stored thereon for directing a processor circuit to execute the method of claim 48.

51. A keyboard-type device comprising:
(a) keyboard input key means for generating a stream of input key events in response to user input;
(b) display means for displaying information to the user; and
(c) a processor circuit in communication with said keyboard input key means and said display means, said processor circuit configured to:
(i) direct at least some input key events to a remote computing device;
(ii) monitor the stream of input key events for a first predefined input key event;
(iii) in response to identifying the first predefined input key event in the stream of input key events, cause at least some input key events following the first predefined input key event to be directed to a predictive text entry system and not to the remote computing device, wherein the predictive text entry system is operable to generate a set of predictive text completion candidates for completing a partial text entry generated in response to the user input; and
(iv) communicate a particular predictive text completion candidate from said set of predictive text completion candidates to the remote computing device in response to user selection of the particular predictive text completion candidate.

52. The keyboard-type device of claim 51 wherein the keyboard input key means comprises a plurality of user input signal generators.

53. The keyboard-type device of claim 52 wherein the plurality of user input signal generators comprises a plurality of virtual keys displayed by the display means.

* * * * *